US012540297B2

(12) United States Patent
Cho et al.

(10) Patent No.: US 12,540,297 B2
(45) Date of Patent: Feb. 3, 2026

(54) MICROFLUIDIC DEVICE FOR CEREBROVASCULAR SIMULATION AND HIGH-EFFICIENCY BLOOD-BRAIN BARRIER SIMULATION SYSTEM COMPRISING SAME

(71) Applicant: CELLARTGEN INC., Seoul (KR)

(72) Inventors: Seung Woo Cho, Seoul (KR); Yong Sun Bahn, Seoul (KR); Jin Kim, Seoul (KR); Kyung Tae Lee, Seoul (KR)

(73) Assignee: CELLARTGEN INC., Seoul (KR)

( * ) Notice: Subject to any disclaimer, the term of this patent is extended or adjusted under 35 U.S.C. 154(b) by 960 days.

(21) Appl. No.: 17/277,640

(22) PCT Filed: Sep. 19, 2019

(86) PCT No.: PCT/KR2019/012135
§ 371 (c)(1),
(2) Date: Mar. 18, 2021

(87) PCT Pub. No.: WO2020/060222
PCT Pub. Date: Mar. 26, 2020

(65) Prior Publication Data
US 2021/0348098 A1 Nov. 11, 2021

(30) Foreign Application Priority Data
Sep. 19, 2018 (KR) .................. 10-2018-0111964

(51) Int. Cl.
*C12M 1/00* (2006.01)
*B01L 3/00* (2006.01)
(Continued)

(52) U.S. Cl.
CPC ............ *C12M 23/16* (2013.01); *C12M 23/20* (2013.01); *C12M 27/10* (2013.01)

(58) Field of Classification Search
CPC ........................... C12M 23/16; C12M 25/14
See application file for complete search history.

(56) References Cited

U.S. PATENT DOCUMENTS 10,030,219 B2* 7/2018 Cha .................... C12M 29/10
10,751,715 B1* 8/2020 Guan ................ B01L 3/502715
(Continued)

FOREIGN PATENT DOCUMENTS

EP 2 526 978 A1 11/2012
KR 10-2009-0041962 A 4/2009
(Continued)

OTHER PUBLICATIONS

International Search Report of PCT/KR2019/012135 dated Mar. 20, 2020.
(Continued)

*Primary Examiner* — Nathan A Bowers
(74) *Attorney, Agent, or Firm* — HSML P.C.

(57) ABSTRACT

The present disclosure provides a microfluidic device for simulating a blood-brain barrier and a blood-brain barrier simulation system including the same, and the microfluidic device includes: a first channel; a second channel which is adjacently connected to the first channel through one or more microholes and configured to culture neural stem cells; and a chamber which is connected to both ends of the first channel and contains a culture medium.

14 Claims, 33 Drawing Sheets

(51) Int. Cl.
*C12M 3/04* (2006.01)
*C12M 3/06* (2006.01)

(56) References Cited

U.S. PATENT DOCUMENTS

| | | | | |
|---|---|---|---|---|
| 11,371,022 | B2* | 6/2022 | Park | C12N 5/0062 |
| 2008/0299169 | A1* | 12/2008 | Hoffman-Kim | C12N 5/0068 |
| | | | | 435/395 |
| 2014/0057311 | A1* | 2/2014 | Kamm | G01N 33/5029 |
| | | | | 216/33 |
| 2014/0065660 | A1* | 3/2014 | Kim | G01N 33/5058 |
| | | | | 435/297.2 |
| 2014/0142370 | A1 | 5/2014 | Wong et al. | |
| 2016/0326477 | A1 | 11/2016 | Fernandez-Alcon et al. | |
| 2018/0298317 | A1* | 10/2018 | Ingber | C12M 23/16 |
| 2018/0345280 | A1* | 12/2018 | Vulto | B01L 9/527 |
| 2019/0359924 | A1* | 11/2019 | Kerns | C12N 5/0619 |
| 2020/0181555 | A1* | 6/2020 | Hinojosa | B01L 3/502738 |
| 2020/0339956 | A1* | 10/2020 | Alder | C12N 5/0681 |
| 2021/0108178 | A1* | 4/2021 | Huh | C12N 5/0691 |
| 2021/0130774 | A1* | 5/2021 | Sances | C12M 41/46 |

FOREIGN PATENT DOCUMENTS

| | | |
|---|---|---|
| KR | 1020120118444 A | 10/2012 |
| KR | 10-2013-0013119 A | 2/2013 |
| KR | 10-1234276 B1 | 2/2013 |
| KR | 10-1401199 B1 | 5/2014 |
| KR | 10-2015-0036907 A | 4/2015 |
| KR | 10-2015-0135669 A | 12/2015 |
| KR | 10-2016-0005279 A | 1/2016 |
| KR | 10-1747378 B1 | 6/2017 |
| WO | 2017/035119 A1 | 3/2017 |
| WO | 2017/070224 A1 | 4/2017 |
| WO | 2018/020274 A1 | 2/2018 |

OTHER PUBLICATIONS

The extended European search report of European Patent Application No. 19 863 762.1, dated May 13, 2022, 13 pages.

* cited by examiner

MICROFLUIDIC DEVICE FOR
CEREBROVASCULAR SIMULATION AND
HIGH-EFFICIENCY BLOOD-BRAIN
BARRIER SIMULATION SYSTEM
COMPRISING SAME

TECHNICAL FIELD

The present disclosure relates to a novel microfluidic device and system capable of efficiently simulating a blood-brain barrier.

BACKGROUND

Unlike macro-scale culture, culturing cells using a microfluidic device is a technique that provides a microenvironment suitable for cells and precisely regulates culture conditions for cells which respond sensitively to the surrounding environment, and is recently receiving a lot of attention in the field of cell and tissue engineering.

Microfluidic-based studies have several advantages over conventional laboratory-level analytical processes because they provide faster and more sensitive detection results while using smaller volumes of formulation.

Recently, microfluidic technology has been used in all the fields of biochemical research, and also has been increasingly used in the field of neuroscience.

However, unlike static culture, dynamic culture requires a fluid flow. Thus, the dynamic culture requires complicated equipment, such as a syringe pump or a hydraulic pump, and an expert.

The brain uses about 20% of the available oxygen for normal function to strictly regulate the oxygen transfer necessary for blood flow and survival.

The transwell system, which has been mainly used as a conventional blood-brain barrier model, is just a 2D culture system and provides a microenvironment different from the brain tissue and thus cannot simulate the real blood-brain barrier.

Also, the system has a problem in that it cannot check cells with clear morphology in real time due to a porous membrane having low transparency, and also cannot provide a unidirectional flow of culture medium, which is known to be very important for vascular function.

As the importance of astrocytes in the blood-brain barrier tissue has increased, many studies have attempted to enhance the function of the existing model by co-culturing the astrocytes on the underside of a porous membrane of a transwell in which vascular endothelial cells are cultured. However, there has been a problem in that direct contact with the vascular endothelial cells necessary for the function of the astrocytes cannot be realized.

Further, a conventional chip-based dynamic culture system requires a high degree of proficiency because the system has a complicated structure in which a tube and a fluid controller need to be connected to each chip and is not easy to control, and in the case of 3D culture, the hydrogel with weak physical properties can be damaged even by a slight pressure difference.

DISCLOSURE OF THE INVENTION

Problems to be Solved by the Invention

The present disclosure is conceived to provide a microfluidic device capable of precisely controlling the culture environment without a need for separate subsidiary facilities to solve the above-described problems of the prior art, and a high-efficient blood-brain barrier simulation system using the same.

Means for Solving the Problems

The present disclosure provides a microfluidic device for simulating a neurovascular unit, including: a first channel; a second channel which is adjacently connected to the first channel through one or more microholes and configured to culture neural stem cells; and a chamber which is connected to both ends of the first channel and contains a culture medium.

An inner surface of the first channel may be coated with a coating solution containing at least one selected from the group consisting of poly-L-lysine and collagen.

The microfluidic device may further include endothelial cells adhered and cultured on an inner surface of the first channel, and the microfluidic device may further include pericytes adhered and cultured on lower ends of the endothelial cells and the inner surface of the first channel.

The second channel may include a hydrogel for culturing the neural stem cells in three dimensions.

The hydrogel may include collagen and crosslinked or non-crosslinked hyaluronic acid.

The concentration of the collagen in the hydrogel may be from 3.0 mg/ml to 5.0 mg/ml, and the concentration of the crosslinked or non-crosslinked hyaluronic acid in the hydrogel may be from 1.0 mg/ml to 10.0 mg/ml.

The hydrogel may have an expansion ratio represented by Equation 1 of from 50% to 150%:

$$\text{Expansion Ratio (\%)} = \frac{(Ws - Wi) \times 100}{Wi} \qquad \text{[Equation 1]}$$

Here, Wi and Ws represent the dry weight of the hydrogel before incubation and the wet weight of the hydrogel after incubation with PBS at 37° C. for 3 days, respectively.

The culture medium may be a medium in which an EGM-2 basal medium and a DMEM/F12 basal medium are mixed, and an N-2 supplement, an EGM-2 supplement, a pericyte growth supplement, and 0.5% to 3% FBS may be added into the mixed medium as significant factors.

The microfluidic device may further include a third channel adjacent to the second channel.

The mean diameter of the first channel may be from 0.1 mm to 1.0 mm, and the mean diameter of the second channel may be from 0.5 mm to 1.5 mm.

In an embodiment of the present disclosure, there is provided a complex microfluidic device for simulating other organs than cerebral blood vessel, including: a first channel; a second channel which is adjacently connected to the first channel through one or more microholes and configured to culture neural stem cells and a 2-1 channel configured to culture other organ cells; and a chamber which is connected to both ends of the first channel and contains a culture medium.

In another embodiment of the present disclosure, there is provided a blood-brain barrier simulation system, including: the device; and a tilt control means for controlling the tilt of the device.

The tilt control means may be a syringe pump located at a lower end of the device.

The tilt control means may provide a unidirectional flow to the culture medium in the first channel.

In the device, the second channel or the 2-1 channel may be located at a lower end of the first channel.

Effects of the Invention

The system of the present disclosure more effectively simulates the structure and function of the real human blood-brain barrier and thus it can be utilized as an in-vitro model system capable of discovering various drugs that can target or permeate the blood-brain barrier.

Unlike a conventional microfluidic chip that requires a connection to an external device for dynamic culture, the system of the present disclosure is easy to set up and use, and, thus, user convenience can be significantly increased.

The system of the present disclosure can construct a mass production platform, which is an important factor in screening, and, thus, the efficiency of drug development can be improved and the cost for development can be significantly reduced.

The system of the present disclosure enables real-time monitoring of various phenomena, such as vascular permeability of drugs and effects on neurons, and, thus, the success rate of drug development can be significantly increased.

BEST MODE FOR CARRYING OUT THE INVENTION

Figure 1A:
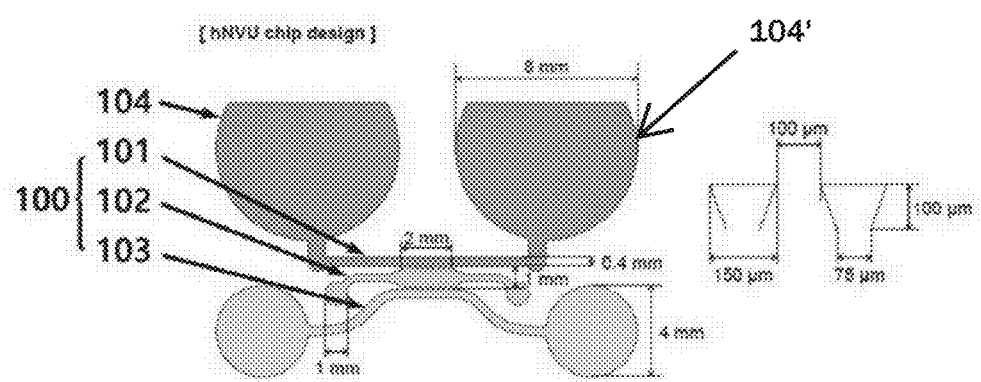
FIG. 1A relates to the design and dimensions of an hNVU chip, and shows the design and dimensions of a microfluidic device for hNVU chip.

Hereafter, the present disclosure will be described in detail with reference to the accompanying drawings. However, the present disclosure can be embodied in various other ways and is not limited to the examples described herein. The term "comprises or includes" and/or "comprising or including" used in the document means that one or more other components, steps, operation and/or existence or addition of elements are not excluded in addition to the described components, steps, operation and/or elements unless context dictates otherwise.

Unless otherwise indicated, the practice of the disclosure involves conventional techniques commonly used in molecular biology, microbiology, protein purification, protein engineering, protein and DNA sequencing, and recombinant DNA fields, which are within the skill of the art. Such techniques are known to a person with ordinary skill in the art and are described in numerous standard texts and reference works.

Unless defined otherwise herein, all technical and scientific terms used herein have the same meaning as commonly understood by those of skill in the art to which this disclosure belongs.

Various scientific dictionaries that include the terms included herein are well known and available to those in the art. Although any methods and materials similar or equivalent to those described herein find use in the practice or testing of the disclosure, some preferred methods and materials are described. The present disclosure is not limited to the particular methodology, protocols, and reagents described, as these may vary, depending upon the context in which they are used by a person with ordinary skill in the art. Hereinafter, the present disclosure will be described in more detail.

Microfluidic Device for Simulating Neurovascular Unit

According to an aspect of the present disclosure, there is provided a microfluidic device 100 for simulating a neurovascular unit, including: a first channel 101; a second channel 102 which is adjacently connected to the first channel 101 through one or more microholes and contains neural stem cells; a first chamber 104 which is connected to one end of the first channel 101 and contains a culture medium, and a second chamber 104' which is connected to another end of the first channel 101 and contains a culture medium.

According to another aspect of the present disclosure, there is provided a complex microfluidic device 100' for simulating other organs than cerebral blood vessel, including: a first channel 101; a second channel 102 which is adjacently connected to the first channel 101 through one or more microholes and configured to culture neural stem cells and a 2-1 channel 102' configured to culture other organ cells; and a chamber which is connected to both ends of the first channel 101 and contains a culture medium.

The "microfluidic device" is a microfluidic device for simulating a neurovascular unit and can efficiently simulate a blood-brain barrier by three-dimensionally co-culturing human neural stem cells in a three-dimensional hydrogel matrix where human vascular endothelial cells and brain tissue are simulated. Also, the "complex microfluidic device" has a combined structure of the microfluidic device for simulating a neurovascular unit and a microfluidic device for simulating other organs. Here, the other organs may refer to various human organs, such as liver, lung, intestine, kidney, heart, etc., other than cerebral blood vessel.

The "blood-brain barrier" is designed to protect the brain and has a remarkably lower permeability than other blood vessels, and an efficient model for the development of new drugs for brain diseases is needed because the permeation mechanism is not clear. Thus, the blood-brain barrier can be used as an animal replacement model for the development of new drugs for brain diseases.

The most important factor in implementing the function of the blood-brain barrier is an astrocyte vascular end feet structure in which a cerebral vascular endothelial cell is in contact with an astrocyte due to a tight junction of the cerebral vascular endothelial and a protrusion of the astrocyte, and the device can effectively implement the cell composition and structure specific to the blood-brain barrier.

Particularly, in conventional dynamic culture systems using a microfluidic chip, a fluid controller has to be connected to each chip, but the device enables dynamic culture by providing a precise flow of a culture medium through a head drop in an open channel chip.

The "microfluid" may be a component in which a moving fluid is trapped in a channel having a diameter of 10 mm or less (microscale) or guided through the channel.

The microfluidic channel may be larger than the microscale in one or more directions although the channel may be microscale in at least one direction. Also, in an example, the geometry of the microfluidic channel may be configured to control the flow rate of a fluid passing through the channel.

The microfluidic channel may have various geometries that facilitate the passage through the channel in a wide range of flow rates.

The device may be formed of various materials such as poly(dimethylsiloxane) (PDMS), polymethylmethacrylate (PMMA), polyacrylates, polycarbonates, polycyclic olefins, polyimides, polyurethanes, glass, silicon, quartz, etc., but is not limited thereto.

The "first channel" is a microfluidic channel that simulates a cerebral blood vessel, and the chamber 104 containing the culture medium may be connected to both ends of the first channel 101.

The chamber 104 has an open structure in which the culture medium is stored. Since the chamber 104 is connected to the first channel 101, the culture medium can be precisely formed by controlling the tilt of the device.

The "culture medium" is a culture medium for cells and is a medium for transporting nutrients or oxygen. The culture medium is capable of supplying nutrients or oxygen necessary for cells and removing waste. In the device, the culture medium can simulate the blood flow of a real cerebral blood vessel.

In an example, the culture medium may be a medium in which an EGM-2 basal medium and a DMEM/F12 basal medium are mixed, and desirably, may be a medium in which an EGM-2 basal medium and a DMEM/F12 basal medium are mixed at a weight ratio of 2:1 to 1:2, but is not limited thereto. Also, an N-2 supplement, an EGM-2 supplement, a pericyte growth supplement, and 0.5% to 3% (desirably, 1% to 2%) FBS may be added into the mixed medium as significant factors.

The second channel 102 may be adjacently connected to the first channel 101 through one or more microholes and may contain neural stem cells.

The "neural stem cell (NSC)" is a cell capable of self-renewal and differentiation into a nervous system cell. The neural stem cell can be differentiated into neuron, astrocyte, oligodendrocyte.

The "stem cell" refers to a cell capable of differentiation into various kinds of new cells with self-replication ability, and the stem cell can be classified into totipotent stem cell, pluripotent stem cell and multipotent stem cell depending on the differentiation ability, and can be classified into adult stem cell, embryonic stem cell, and dedifferentiated stem cell depending on the origin tissue.

The "second channel" is a microfluidic channel that is adjacent to the first channel 101 and simulates the brain tissue of a living body, and can simulate the permeability between the first channel 101 and the second channel 102. The one or more "microholes" connect the first channel 101 and the second channel 102 to reproduce the permeability, the movement and exchange of materials between the first channel 101 and the second channel 102.

The mean diameter of the first channel 101 may be from 0.1 mm to 1.0 mm, and the mean diameter of the second channel 102 may be from 0.5 mm to 1.5 mm.

The diameters of the first channel 101 and the second channel 102 may be varied as necessary, but the diameter of the second channel 102 may be larger than that of the first channel 101 in consideration of the diameter of a blood vessel that is relatively narrower than the brain tissue.

The device may further include endothelial cells and pericytes adhered and cultured on an inner surface of the first channel 101. Here, the inner surface of the first channel 101 may be coated with a coating solution containing at least one selected from the group consisting of poly-L-lysine and collagen, and desirably, may be double coated with a coating solution containing poly-L-lysine and collagen. Therefore, it can promote efficient formation of endothelial monolayer.

The "endothelial cell" may be desirably a cerebral vascular endothelial cell, and optionally astrocytes, optionally, neurons and, optionally, perivascular cells can be cultured in the device under conditions whereby the cells mimic one or more structural or functional features (for example, tight junctions) of the blood-brain barrier (BBB) or spinal cord.

The "pericyte" affects the differentiation or inhibition of endothelial cells by adhering to the endothelial cells, and plays a role as a precursor cell through various differentiation abilities. Therefore, it is recognized as an important regulator for the development, stabilization, maturation and remodeling of blood vessels and considered an important target in the study of the causes and treatments of vascular diseases.

The cerebral vascular endothelial cells may be adhered and cultured to form a single layer on the surface of the channel and the pericytes may be adhered and cultured at lower ends of the endothelial cells and may form a separate layer to simulate a real vascular endothelial tissue in vivo.

The second channel 102 may include a hydrogel for culturing the neural stem cells in three dimensions.

The culture refers to a process of maintaining and growing cells under suitable conditions, and the suitable conditions may refer to, for example, temperature, nutrient availability, atmospheric $CO_2$ content, and cell density at which the cells are maintained. Appropriate culture conditions for maintaining, proliferating, expanding and differentiating different types of cells are known in the art and are documented.

The "hydrogel" is a material in which a liquid that contains water as a dispersion medium is hardened, through a sol-gel phase transition, to lose fluidity and to form a porous structure. The hydrogel can be formed by causing a hydrophilic polymer that has a three-dimensional network structure and a microcrystalline structure to contain water and to be expanded.

The "three-dimensional culture" provides an environment similar to real tissue by excluding a process in which cells adapt to the two-dimensional environment of a flat plate, and can induce cell growth, differentiation, and function in vivo.

The three-dimensional culture can effectively mimic the real in vivo tissue environment in an in vitro environment, and can improve the reliability of results and the stability and validity of experiments.

The hydrogel may include collagen and crosslinked or non-crosslinked hyaluronic acid.

The crosslinked or non-crosslinked hyaluronic acid can significantly increase the physical properties (elastic modulus) of the hydrogel, and since the physical properties are similar to those of real brain tissue, it is possible to more efficiently simulate a blood-brain barrier.

In an example, the crosslinked hyaluronic acid may modify a catechol group to hyaluronic acid by reacting the hyaluronic acid with a material containing the catechol group. Here, with respect to the hyaluronic acid, the molar ratio of the material containing the catechol group may be from 2% to 7%. For example, the hyaluronic acid may be reacted with one or more selected from the group consisting of dopa, dopamine, norepinephrine, lithospermic acid, caffeic acid, rosmarinic acid, salvianolic acid and gallic acid.

In an example, the concentration of the collagen in the hydrogel may be from 3.0 mg/ml to 5.0 mg/ml, desirably from 3.5 mg/ml to 4.5 mg/ml, and the concentration of the crosslinked or non-crosslinked hyaluronic acid in the hydrogel may be from 1.0 mg/ml to 10.0 mg/ml, desirably from 6.0 mg/ml to 8.0 mg/ml.

Thus, in the frequency range of from 0.1 Hz to 10 Hz, the storage elastic modulus of the hydrogel can be maintained at a high level of from 200 Pa to 500 Pa, desirably from 200 Pa to 500 Pa. Also, the expansion ratio of the hydrogel represented by Equation 1 can be maintained at a high level of from 50% to 150%, desirably from 100% to 150%:

$$\text{Expansion Ratio (\%)} = \frac{(Ws - Wi) \times 100}{Wi} \quad \text{[Equation 1]}$$

Here, Wi and Ws represent the dry weight of the hydrogel before culture and the wet weight of the hydrogel after culture with PBS at 37° C. for 3 days, respectively.

In an example, the device 100 or 100' may further include a third channel 103 adjacent to the second channel 102.

The third channel 103 can supply various materials, such as drugs or nutrients, to the second channel 102 as necessary, and one or more microholes that provide permeability can be formed to enable the exchange of materials between the second channel 102 and the third channel 103.

Meanwhile, if the device 100 or 100' is the complex device 100', the complex device 100' may further include a 3-1 channel 103' adjacent to the 2-1 channel 102'.

The 3-1 channel 103' can also supply various materials, such as drugs or nutrients, to the 2-1 channel 102' as necessary. Likewise, one or more microholes that provide permeability can be formed to enable the exchange of materials between the 2-1 channel 102' and the 3-1 channel 103'.

Blood-Brain Barrier Simulation System

According to another aspect of the invention, there is provided a blood-brain barrier simulation system, including: the device 100 or 100'; and a tilt control means 200 for controlling the tilt of the device.

The device 100 or 100' includes the chamber 104 having an open structure, and the culture medium stored in the chamber 104 may be provided with a unidirectional flow in a desired direction through tilting. Thus, it is possible to control the tilt of the device in consideration of how the device is placed or fixed.

Unlike the prior art, the blood-brain barrier simulation system does not need a controller to control a fluid of each device or chip and can provide the flow of fluid by simply controlling the tilt of the device and thus forming a head drop.

The tilt control means 200 is not particularly limited as long as it can constantly maintain the head drop of the device 100 or 100' or can precisely adjust the head drop of the device 100 or 100' in proportion to time. Desirably, the tilt control means 200 may be a syringe pump located at a lower end of the device.

The syringe pump may have a driving cycle including two separate operations, i.e., suction and discharge of the fluid, and the syringe pump may be used for precisely controlling the amount of fluid.

The syringe pump may include a syringe cylinder and a plunger of a rod piston that linearly reciprocates while being inserted in the syringe cylinder by a predetermined driving means, and the syringe cylinder can perform the operations of suction and discharge of fluid through linear reciprocation of the plunger.

Specifically, the second channel 102 or the 2-1 channel 102' may be located at a lower end of the first channel 101 in the device.

The device 100 or 100' may be disposed horizontally or vertically. However, if the device 100 or 100' is disposed in a vertical manner such that the second channel 102 or the 2-1 channel 102' is located at the lower end of the first channel 101, the system can be operated more easily. In particular, an overflow of the culture medium stored in the chamber 104 may be minimized despite a change in the tilt of the device.

In an example, the blood-brain barrier simulation system may include: one or more devices 100 or 100'; a support 300 configured to support the one or more devices; and a syringe pump located at a lower end of the support 300.

The support 300 just needs to arrange or dispose thereon one or more devices and may be, for example, a flat plate shape or a box-shaped housing. However, the support 300 is not particularly limited in the shape, size and material as long as it can stably support one or more devices by using plane features.

In particular, the blood-brain barrier simulation system may be equipped with one or more devices 100 or 100' and configured to collectively control the tilts of the devices. Therefore, a dynamic flow can be uniformly provided to a plurality of devices 100 or 100', which can be implemented by a single syringe pump. Accordingly, it is possible to maximize culture efficiency and ease of use.

MODE FOR CARRYING OUT THE INVENTION

Hereinafter, the present disclosure will be described in more detail with reference to examples, but it is obvious that the present disclosure is not limited to the following examples.

Example

Cell Culture

Human fetal NSCs were isolated from the human fetal brain at 13 weeks gestation (protocol #4-2003-0078). The NSCs (passages 17 to 23) were cultured in Dulbecco's modified Eagle's medium/nutrient mixture F-12 (DMEM/F12) medium (Gibco BRL, Gaithersburg, MD, USA) with an N-2 supplement (Invitrogen, Carlsbad, CA, USA). For expansion, basic fibroblast growth factor (30 ng/ml, Pepro-Tech, Rocky Hill, NJ, USA) and leukemia inhibitory factor (10 ng/ml, Merck Millipore, Darmstadt, Germany) were added to the culture medium. Human cerebral microvascular endothelial cells (hCMEC/D3; Cedarlane, Ontario, Canada) were cultured in an endothelial growth medium (EGM™-2 SingleQuots™; Lonza, Verviers, Belgium) in a 150 µg/ml Col-coated flask. Human brain vascular pericytes (HBVP; ScienCell Research Laboratories, Carlsbad, CA, USA) were cultured in a pericyte medium (ScienCell Research Laboratories) containing 2% FBS, 1% penicillin-streptomycin and a PC growth supplement (ScienCell Research Laboratories). A cell culture flask for culturing HBVP was coated with a 20 µg/ml PLL solution (Sigma-Aldrich, St. Louis, MO, USA) before cell seeding. For all experiments, hCMEC/D3 cells of passages 27 to 32 and HBVP cells of passages 2 to 10 were used. The cells were cultured in a 37° C., 5% $CO_2$ humidified incubator.

Preparation of Col and BHEM Hydrogels

Col (Corning Inc., Corning, NY, USA) was prepared as previously described, and crosslinked by incubation at 37° C. for 30 minutes to produce a Col hydrogel (final concentration of 4.4 mg/ml, pH 7.4, 1×PBS). HA-CA conjugate was synthesized as previously described. The HA-CA conjugate was dissolved in distilled water at a concentration of 1% (w/v) and treated with the same proportion of 1-ethyl-3-(3-dimethylaminopropyl)carbodiimide (TCI Co., Tokyo, Japan) and N-hydroxysulfosuccinimide (Sigma-Aldrich) as HA for 30 minutes to produce HA (MW 200 kDa, Lifecore Biomedical, Chaska, MN, USA). Then, dopamine hydrochloride (Sigma-Aldrich) was added to the reaction solution with the same molar ratio as HA. The pH of the solution was maintained at 5.0 to suppress dopamine oxidation during overnight reaction of the mixture. Unreacted dopamine hydrochloride was removed by repeated dialysis (4 times for each of 6 hours with 1×PBS (pH 5.0, Biosesang, Seongnam, Korea) and 1 time for 4 hours with distilled water). The final solution was frozen and lyophilized. A BHEM hydrogel was prepared by mixing Col (final concentration of 3.7 mg/ml) containing an oxidizing agent ($NaIO_4$, final concentration of 0.5 mg/ml) with a HA-CA solution (final concentration of 7.1 mg/ml).

Characteristics of Hydrogels

The rheological characteristics of the Col and BHEM hydrogels were measured using a rotary rheometer (MCR102; Anton Paar, Ashland, VA, USA) in a frequency sweep mode (0.1 to 10 Hz) at a constant strain of 0.5%. The hydrogels (each n=4, volume=50 µl) were completely cross-linked and loaded onto a substrate. To measure the elastic modulus, the hydrogels were pressed using a flat probe (diameter=25 mm) with a gap size of 250 µm. The swelling and contraction characteristics of the Col and BHEM hydrogels were determined by incubating hydrogel structures in PBS (Sigma Aldrich) at 37° C. for 3 days. After excess water on the hydrogels were removed at various time points during incubation, the wet weights of the hydrogels were measured. The expansion ratio was calculated according to Equation 1. Here, Wi and Ws represent the dry weight of a hydrogel incubation and the wet weight of the hydrogel after incubation with PBS at 37° C. for 3 days, respectively.

$$\text{Expansion Ratio (\%)} = \frac{(Ws - Wi) \times 100}{Wi} \quad (1)$$

Fluorescence recovery after photobleaching (FRAP) was performed to measure the diffusion coefficient of an FITC-dextran probe. Hydrogel samples were placed on a PDMS chip with a glass cover slip at the bottom along with PBS serving as a control. Photobleaching was induced using a laser scanning confocal microscope (LSM 880, Carl Zeiss, Jena, Germany) with a 20× magnification objective lens and a laser tuned to 488 nm with 100% output power. For uniform diffusion across the gel structures, the hydrogels were incubated with a 0.5 mg/ml 70 kDa FITC-dextran (Sigma Aldrich) solution in PBS for 24 hours prior to the FRAP experiment. A bleached region was monitored with 10 pre-bleached images and 150 images (about 150 seconds in total) of FRAP that was scanned with a low laser intensity (1%). A normalized fluorescence recovery curve f(t) was calculated according to Equations 2 and 3. Here, F(t), R, Fin, F∞ and F0 represent the fluorescence intensity after photobleaching, the mobile fraction, the background fluorescence intensity prior to photobleaching, the fluorescence intensity recovered at the end of the experiment, and the fluorescence intensity immediately after bleaching, respectively.

$$f(t) = 1 + \frac{1}{R}\left(\frac{F(t) - F_{in}}{F_{in}}\right) \quad (2)$$

-continued $$R = \frac{F_\infty - F_0}{F_{in} - F_0} \quad (3)$$

The diffusion coefficient D of FITC-dextran in a hydrogel was obtained by fitting Equation 2 to Equation 4 and calculated according to Equation 5. Here, b, τD and ω represent a bleaching parameter, a characteristic diffusion time, a Gaussian bleached spot set at 57.5 μm, respectively.

$$f(t) = \sum_{n=0}^{n=\infty} \frac{(-b)^n}{n!} \frac{1}{1 + n[1 + (2t/\tau_D)]} \quad (4)$$

$$D = \frac{\omega^2}{4\tau_D} \quad (5)$$

Fabrication of Microfluidic Device

As described above, a microfluidic device was fabricated with PDMS by the standard soft lithography process. A PDMS pre-polymer (Sylgard 184; Dow Corning, Midland, MI, USA) was mixed with a curing agent at a ratio of 1:10 (w/w) and poured into a silicon wafer mold. A PDMS layer for patterning aligned microchannels was connected by a gap between small posts. Thereafter, the mold was degassed in a vacuum chamber for 5 minutes and then cured in a drying oven at 60° C. for 4 hours. After the PDMS was completely crosslinked, it was peeled off from the mold and punched to form an inlet, an outlet and a medium chamber. The PDMS unit and a cover slip (24 mm×32 mm; Marienfeld, Lauda-Koenigshofen, Germany) were sterilized by autoclaving and completely dried under UV light prior to assembly. Oxygen plasma treatment (CUTE; Femto Science, Seoul, Korea) was applied to combine the PDMS unit with the cover slip. Then, the assembled device was placed in a drying oven at 60° C. The drawings, designs and dimensions of the fabricated chips are shown in FIG. 1 and FIG. 2.

Fabrication of hNVU Chip System

In order to fabricate an hNVU chip, microchannels of a microfluidic device were coated with a 20 μg/ml PLL solution to improve the adhesion of a hydrogel and cells on a channel wall. A Col hydrogel was prepared using a 4.5 mg/ml Col solution. NSCs were encapsulated in Col and BH EM hydrogel solutions at a cell density of $3.33 \times 10^7$ cells/ml, administered to a central channel, and incubated to crosslink the hydrogels (37° C., 20 minutes). An upper channel was further coated with a 5 mg/ml collagen solution to improve EC adhesion and incubated for additional 20 minutes. A DMEM/F12 medium with an N-2 supplement was administered to a lateral channel and the device was incubated in a $CO_2$ incubator. After 1 day of incubation of the NSCs in the 3D hydrogel, HBVP cells and hCMEC/D3 cells were sequentially seeded in the upper channel at cell densities of $1 \times 10^7$ cells/ml and $1 \times 10^6$ cells/ml, respectively. Medium conditions optimized for triple co-culture of NSC, EC and PC were used in the experiment as follows: 1:1 mixture of a DMEM/F12 medium supplemented with an N-2 supplement, an EGM™-2 SingleQuots™ supplement, a PC growth supplement and 1% FBS and an EBM-2 medium (Lonza). The maximum shear stress applied to the EC layer gradually increased over the incubation time. The medium parameter values are listed in FIG. 3C.

Immunohistochemistry

Cells in the hNVU chip were fixed with 2% paraformaldehyde (Sigma-Aldrich) for 30 minutes and permeated with 0.05% Triton X-100 (Sigma-Aldrich) for 30 minutes. After washed and blocked with 5% bovine serum albumin (Wako, Osaka, Japan), the sample was incubated with primary antibodies at 4° C. for 2 days, followed by PBS washing for at least 6 hours. Then, the sample was incubated with Alexa Fluor 488 (Invitrogen)- or Alexa Fluor 594 (Invitrogen)-tagged secondary antibodies at 4° C. for 1 day, followed by PBS washing for at least 6 hours. Nuclei were counterstained with 4',6-diamidino-2-phenylindole (DAPI, Tokyo Chemical Industry Co., Ltd., Tokyo, Japan). The primary antibodies used in the present disclosure are as follows: anti-CD31 (1:200, Millipore, Billerica, MA, USA), anti-Tuj1 (1:150, Cell Signaling Technology, Danvers, MA, USA), anti-GFAP (1:200, Millipore), anti-O4 (1:500, Millipore), anti-NG2 (1:100, Abcam, Cambridge, UK), anti-M-1 (1:100, Invitrogen) and anti-glucuronoxylomannan (anti-GXM, 1:500, 18B7 mouse monoclonal antibody donated by Dr. Arturo Casadevall in Johns Hopkins University).

Quantitative Reverse Transcription Polymerase Chain Reaction (qPCR)

To compare relative gene expression levels between groups, total RNAs were collected from each sample (n=3, technical replicates=3 per group) using an RNeasy mini kit (Qiagen, Chatsworth, CA, USA), and a complementary deoxyribonucleic acid (cDNA) was synthesized using a cDNA synthesis kit (Takara, Shiga, Japan) as directed by the manufacturer. qPCR analysis was performed on a StepOnePlus Real-Time PCR System (Applied Biosystems) using a TaqMan gene expression assay and a TaqMan Fast Universal PCR Master Mix (Applied Biosystems, Foster City, CA, USA). For gene expression analysis in human NSCs, a TaqMan gene expression assay with human-specific primers for the nestin (Hs00707120_s1), Tuj1 (Hs00801390_s1), GFAP (Hs00909238_g1), Olig2 (Hs00300164_s1) and glyceraldehyde-3-phosphate dehydrogenase (GAPDH; Hs02758991_g1) were used. Mouse NSCs were used for NSC differentiation propensity analysis depending on the distance from the EC layer, and, thus, mouse-specific mice for Tuj1 (Mm00727586_s1), GFAP (Mm01253034_m1) and GAPDH (Mm99999915_g1) were used for these samples. Human EC-specific primers for CD31 (Hs00169777_m1), ZO-1 (Hs01551861_m1) and P-gp (Hs00184500_m1) were used for gene expression analysis in human brain EC. The expression level of each target gene was normalized to that of the endogenous reference GAPDH. The relative Ct method was used to determine relative gene expression levels.

Quantification of Barrier Permeability

In order to evaluate BBB permeability, the hNVU chip was placed horizontally on the substrate, and both EC and medium channels were filled with PBS to match the surface levels and homogenize the pressure applied to a 3D matrix. FITC-dextran (70 kDa) or PBS was flowed into the both channels at a flow rate of 100 μl/h. Vascular permeability was evaluated by the flow rate of the solute across the EC barrier according to the reference method. The amount of 70 kDa FITC-dextran penetrating the EC layer is the same as the FITC-dextran accumulated in an NSC-containing 3D hydrogel region according to the mass conservation law. Vascular barrier permeability (Pv) was induced by using the mean intensity of blood vessels (Iv) and tissues (NSC gel, IT) at two different time points t1 and t2, according to Equation 6 calculated by Image J software. Here, Δt, V and $A_{surface}$ are approximated by the mean morphology of the EC layer in the hNVU chip in the 3D confocal image and represent the time between two images in a selected region of interest, the NSC gel volume, and the surface area of the EC layer, respectively.

$$P_v = \frac{1}{(I_V^{t1} - I_T^{t1})} \frac{(I_V^{t1} - I_T^{t1})}{\Delta t} \frac{V}{A_{surface}} \qquad (6)$$

Efflux Pump Efficiency Test

To Measure the Functionality of an Efflux Pump P-Gp Expressed in Cerebral microvascular EC, multiple drug resistance (MDR) analysis was performed. An EC-seed channel was first treated with 100 μg/ml P-gp inhibitor verapamil (99.9%, Acros Organics, Morris Plains, NJ, USA) or with PBS alone as a control for 30 minutes and then washed with PBS, followed by incubation with 1 μM calcein AM (Invitrogen) for 30 minutes. Fluorescence images of the all channels were captured along the z-axis using an LSM 880 confocal microscope, and central layers of the z-axis images were quantified for fluorescence intensity. The same region including the cross section of the EC layer was set as a region of interest for measuring the cell uptake of calcein AM. The laser intensity and gain value of the confocal microscope were adjusted to be the same for all samples.

Stimulus Analysis

Figure 3A:
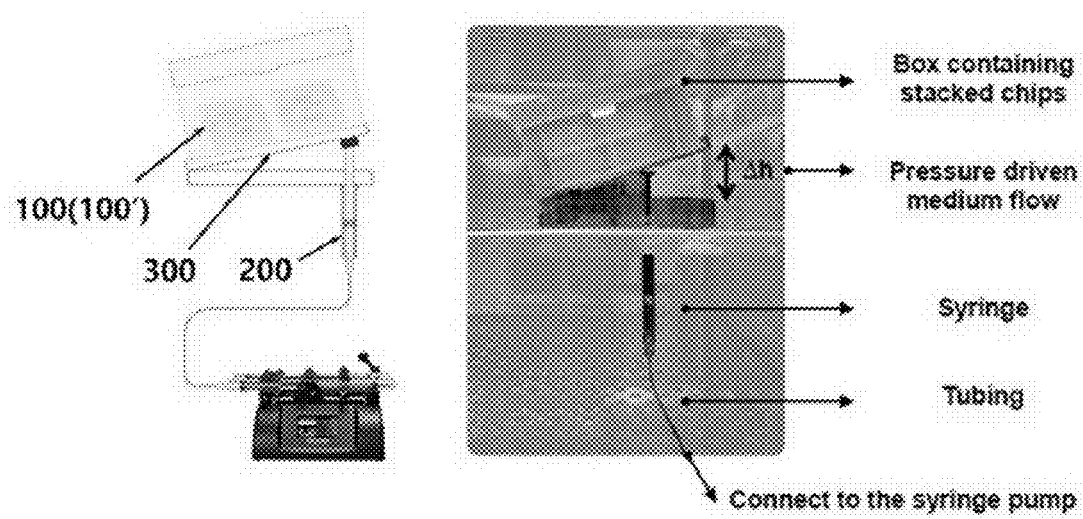
FIG. 3A relates to an experimental set-up for generating a medium flow for dynamic culture and shear stress simulation, and shows the structure of a dynamic culture setting for hNVU chip and also shows that when the fluid is pushed through a syringe connected to a pair of syringes on a syringe pump, a box containing hNVU chips is tilted, which results in a medium level difference required to generate a medium flow in the chip.
Figure 3B:
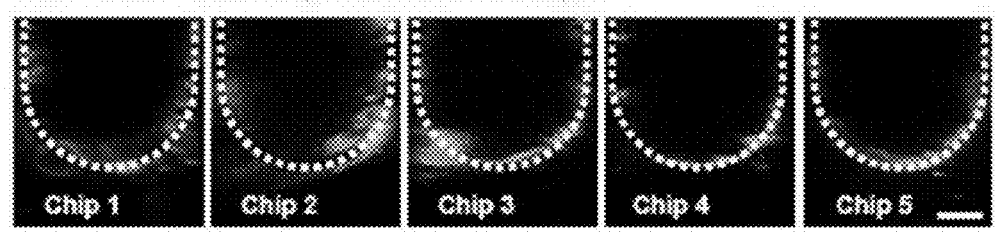
FIG. 3B relates to an experimental set-up for generating a medium flow for dynamic culture and shear stress simulation, and shows 3D confocal images of an EC monolayer in cross section (CD31, green). The scale bar represents 20 μm.
Figure 3C:
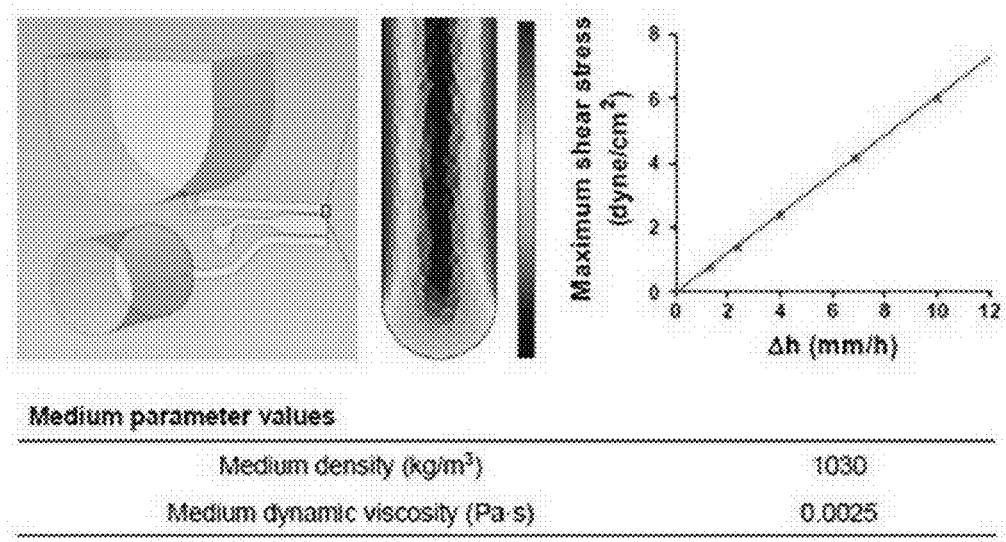
FIG. 3C relates to an experimental set-up for generating a medium flow for dynamic culture and shear stress simulation, and shows a simulation of shear stress using COMSOL Multiphysics® software. The 3D structure of the EC monolayer is presumed from the 3D confocal images shown in FIG. 3B. The asterisk (*) in the graph indicates the maximum shear stress applied to the EC layer at each time point.

A computational model was developed to show the effect of the flow generated in the microfluidic device. Detailed factors and boundary conditions are shown in FIG. 3C. All simulations in the present disclosure were performed using a commercial finite element solver in COMSOL Multiphysics software (COMSOL Inc., Burlington, MA, USA).

Preparation of Fungal Strains

*Cryptococcus neoformans* H99, *Cryptococcus neoformans* mpr1D mutants, *Cryptococcus deuterogattii* R265 and *Candida glabrata* BG2 strains were cultured and maintained in a yeast extract-peptone dextrose (YPD) medium. Each strain was inoculated into the liquid YPD medium at 30° C. for 16 hours and washed with distilled water. For inoculation into the microfluidic chip, the cell number was counted with a hemocytometer and adjusted to $5 \times 10^6$ cells/ml in PBS.

Fungal BBB Invasion Assay

Figure 4A:
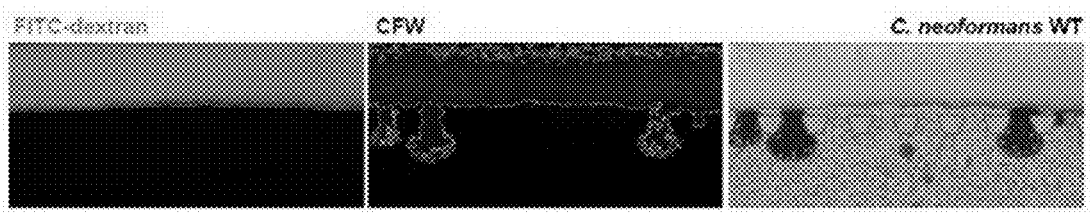
FIG. 4A relates to image-based analysis for quantification of fungal invasion and neuroaffinity in the hNVU chip, and shows measurement and analysis of the fungal invasion. The EC barrier integrity formed in the hNVU chip was tested with FITC-dextran before fungal inoculation. The fluorescence region of an FITC signal was used to determine the boundary of the EC layer for quantification of the CFW-labeled fungal invasion region.

After verification of chip integrity, 60 μl of each fungal cell ($5 \times 10^6$ cells/ml in PBS) was suspended in the same volume of EGM™-2 SingleQuots™. A total of 120 μl samples were inoculated into the upper channel of the hNVU chip (vascular side, final $3 \times 10^5$ cells/chip). To visualize fungal BBB invasion, fungal cells were pre-incubated with 2% CFW (Sigma-Aldrich) in PBS for 30 minutes, washed 5 times with distilled water and resuspended in PBS. Analysis was performed at 37° C. in a $CO_2$ incubator for 24 hours. Fluorescence images for image quantification were captured using an IX71 fluorescence microscope (Olympus, Tokyo, Japan). Z-stacked fluorescence images were captured using an LSM 880 confocal microscope and live images were recorded using a Lumascope 620 live imaging fluorescence microscope (Etaluma Inc., Carlsbad, CA, USA). The image processing method is shown in FIG. 4A.

Study on Multi-Organ hNVU Chip for Fungal Neuroaffinity

Figure 4B:
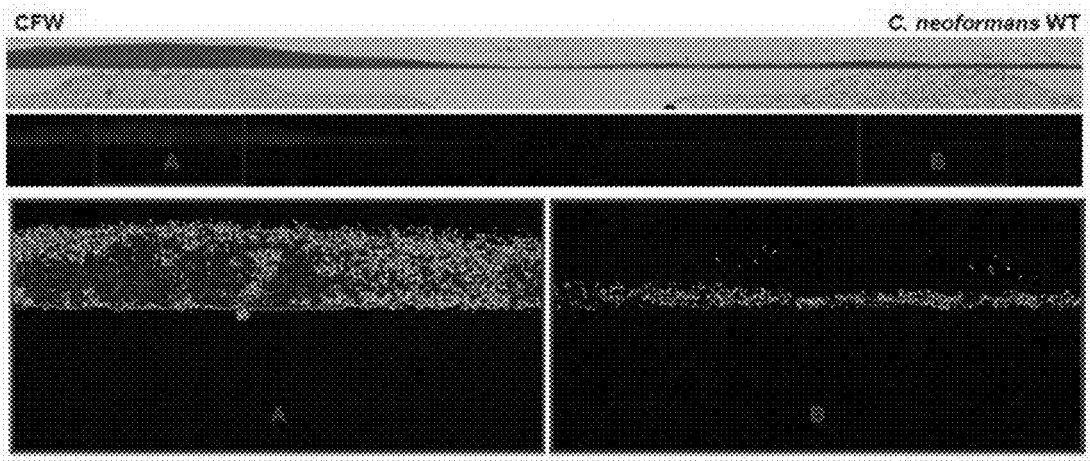
FIG. 4B relates to image-based analysis for quantification of fungal invasion and neuroaffinity in the hNVU chip, and shows measurement analysis of neuroaffinity to quantify CFW-positive fluorescence regions in the brain (A) and liver (B) images of the same size. The image analysis was processed with Image J software.

NSC, PC and EC were seeded in the same manner as described above for fabrication of the hNVU chip system, and $8 \times 10^6$ Huh-7 cells/ml encapsulated in a BMEM hydrogel were seeded in a central channel of a liver unit of the multi-organ hNVU chip. CFW-labeled fungal cells were injected through an upper reservoir of the liver unit so that the fungi were not affected by factors secreted from a brain unit. Simultaneously with fungal inoculation, inositol (200 mg/ml, Duchefa, RV Haarlem, Netherlands) was added only to a lower channel of the liver unit. The image processing method is shown in FIG. 4B.

Statistical Analysis

All data are expressed as mean±standard deviation (S.D.). Student's t-test was applied to calculate statistical probability. Statistical calculations were performed using GraphPad Prism 5 software (GraphPad Software, San Diego, CA, USA). Statistical significance of the data was determined at 95% ($p<0.05$) and 99% ($p<0.01$) confidence intervals.

Example 1: Microfluidic Set-Up for hNVU Chip

Figure 5A:
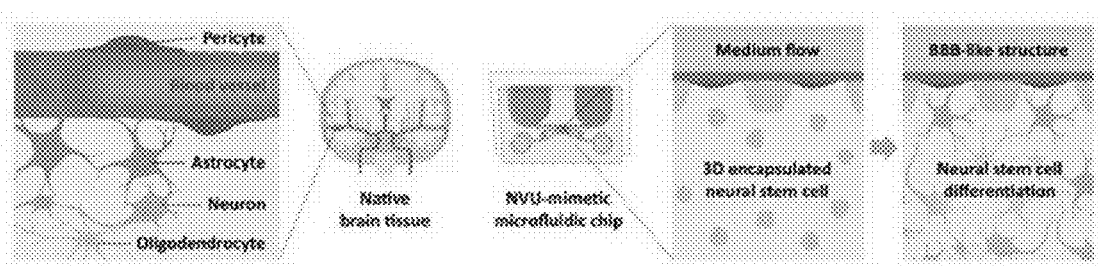
FIG. 5A relates to a schematic diagram of a 3D microfluidic human neurovascular unit (hNVU) chip study, and shows a schematic diagram of hNVU-mimicking chip with a blood-brain barrier (BBB).

To develop an hNVU chip system that mimics 3D human brain tissue with neurovascular units, the present inventors co-cultured multiple human cells (NSC, brain EC and brain PC) in a microfluidic device (FIG. 1). Human NSCs have the potential to differentiate into multiple cell types, including neurons, astrocytes and oligodendrocytes. The present inventors have previously shown that NSCs exhibit a distinct tendency to differentiate in the microfluid depending on their proximity to the EC layer. In a microfluidic device with an vascular mimicking channel in which the EC was cultured on the 3D NSC channel side, most of the NSCs near the EC layer differentiated into astrocytes, but the NSCs far from the EC tended to differentiate into neurons. By using this special differentiation pattern of NSCs near the EC, the present inventors established an in vivo-simulating hNVU including BBB units (EC layer with PC and NSC-derived astrocytes) and neuronal units (neurons differentiated from NSC in a 3D brain ECM-mimicking matrix) in microfluidic chips (FIG. 5A).

Figure 1B:
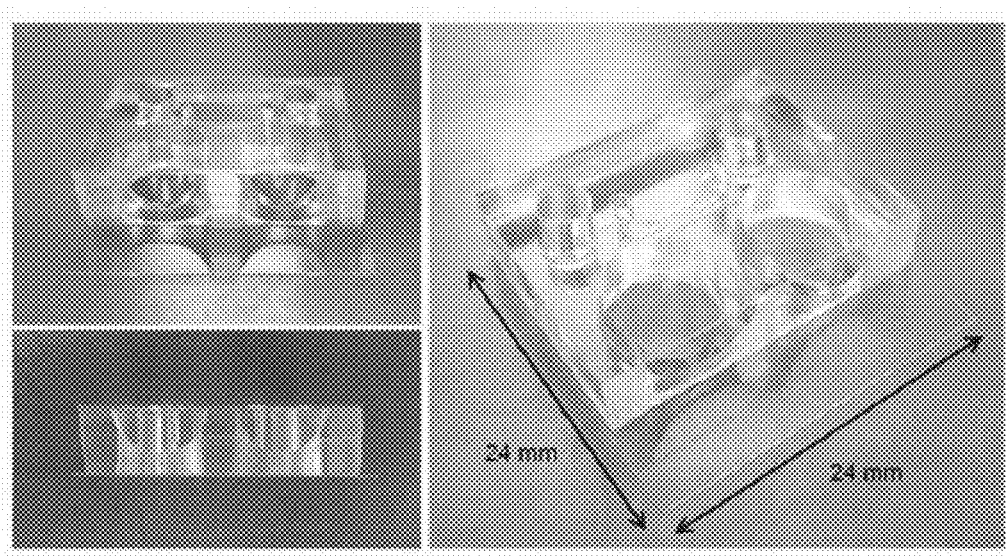
FIG. 1B relates to the design and dimensions of the hNVU chip, and shows photos of the microfluidic device for hNVU chip.
Figure 5B:
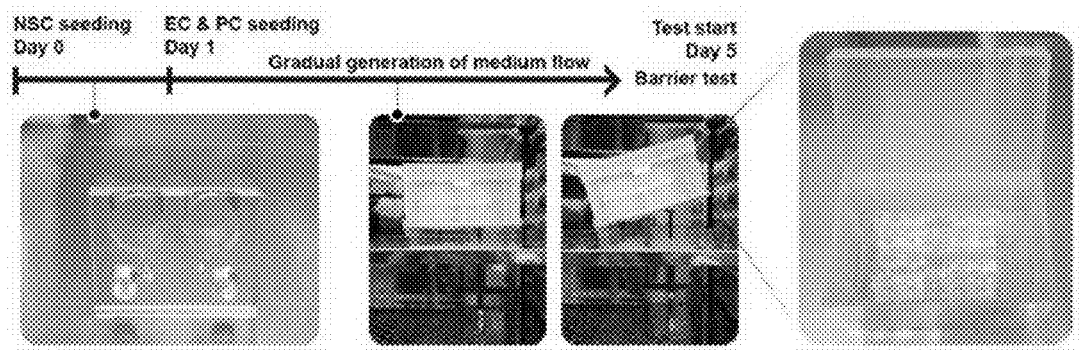
FIG. 5B relates to a schematic diagram of the 3D microfluidic human neurovascular unit (hNVU) chip study, and shows photos illustrating the experimental timeline and chip system for cell seeding and culture for hNVU chip studies.

A microfluidic hNVU chip was made of polydimethylsiloxane (PDMS) with three parallel channels interconnected by small columns (FIG. 1A). The central channel was designed for 3D hydrogel-encapsulated NSC culture, the others were designed for EC culture, test molecule administration and medium supply. The present inventors have adopted an individual tubeless vertical chip design to increase a product from culture compared to that of a conventional syringe pump-based dynamic culture system with multiple tube connections. The vertical design not only facilitates space utilization by stacking many chips vertically, but also induces passive capture of fungi in the EC layer (FIG. 1B). However, the chip may have the same horizontal structure as the conventional chip (FIG. 1B). By using only one syringe pump, a medium flow rate can be generated simultaneously on all chips in a container. When the syringe pump presses one of the syringes, the pressure presses the plunger of the opposite syringe placed under the container. The plunger pushes and tilts the container upwards and continuously provides a stepwise unidirectional flow formed by gravity in the channel for a specific time during incubation (FIG. 3A and FIG. 5B). The brain EC formed a uniform monolayer on the channel under unidirectional dynamic flow (FIG. 3B). It was found that the shear stress value calculated by computer simulation is controlled by the propulsion speed of the syringe pump (FIG. 3C). The shear stress level gradually increased in the range of 0-6 dyne/$cm^2$, similar to that in the brain vasculature.

Example 2: Optimization of 3D ECM Hydrogel and Culture Condition for hNVU Chip

Figure 6:
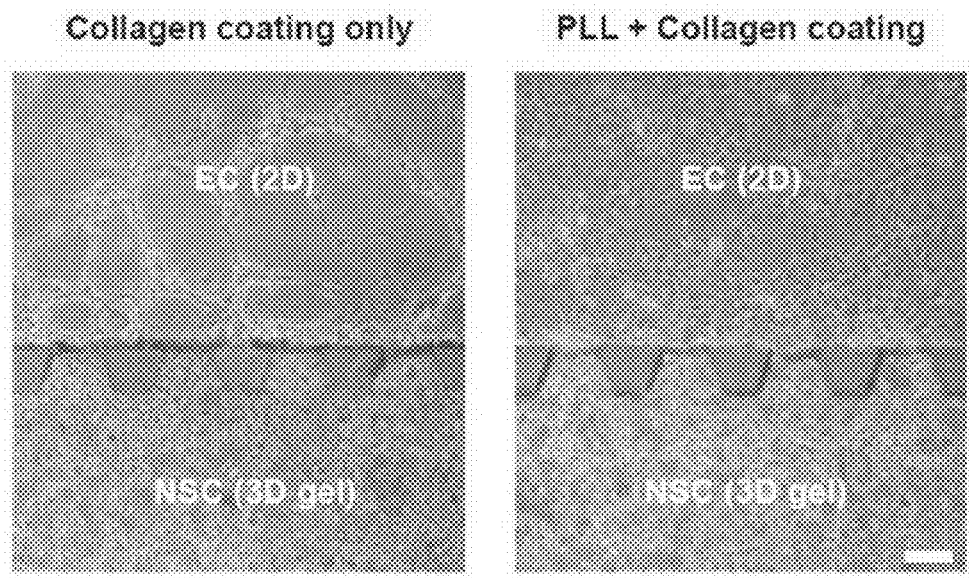
FIG. 6 relates to surface coating of microchannels on a chip, and compares EC attachment and morphology on the microchannels treated with collagen or poly-L-lysine-collagen double coating on day 3. The scale bar represents 100 μm.
Figure 7:
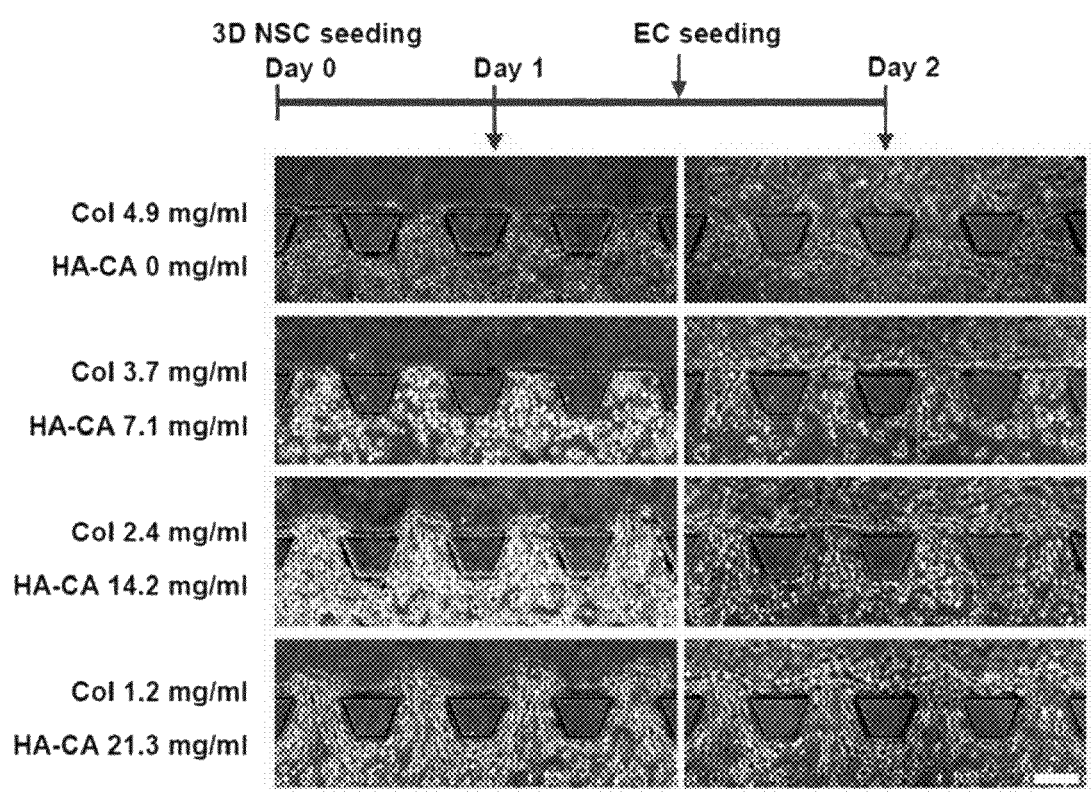
FIG. 7 shows the optimization of 3D hydrogel composition for hNVU chip. The optical images of hydrogels with different concentrations of Col and catechol-modified hyaluronic acid (HA-CA) are intended to support EC and 3D NSC co-culture. Finally, Col (3.7 mg/ml) and HA-CA (7.1 mg/ml) conditions were selected as the optimized hydrogel composition. The scale bar represents 100 μm.
Figure 8A:
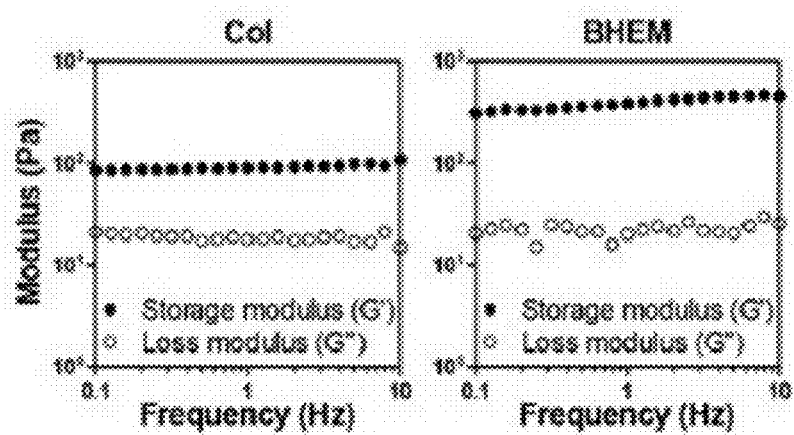
FIG. 8A relates to the characteristics of collagen I (Col) and brain hybrid extracellular matrix (BHEM) hydrogels, and shows rheological analysis of the Col and BHEM hydrogels in a frequency sweep mode. The black and white symbols represent the storage elastic modulus G' and loss elastic modulus G", respectively.
Figure 8B:
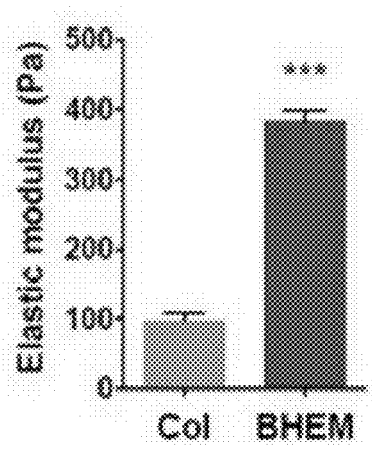
FIG. 8B relates to the characteristics of the collagen I (Col) and brain hybrid extracellular matrix (BHEM) hydrogels, and shows the mean elastic modulus at 1 Hz (n=3, ***p<0.001 compared to Col group).
Figure 8C:
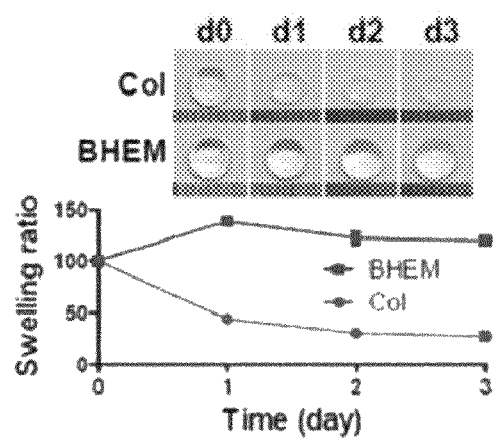
FIG. 8C relates to the characteristics of the collagen I (Col) and brain hybrid extracellular matrix (BHEM) hydrogels, and shows the expansion and contraction properties of the Col and BHEM hydrogels.
Figure 8D:
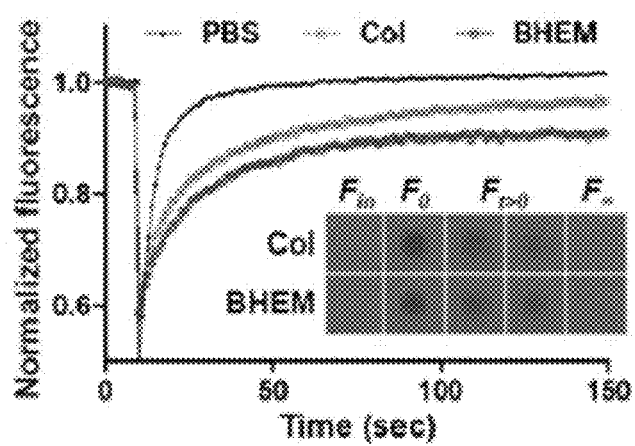
FIG. 8D relates to the characteristics of the collagen I (Col) and brain hybrid extracellular matrix (BHEM) hydrogels, and shows the standardized fluorescence recovery curves.
Figure 8E:
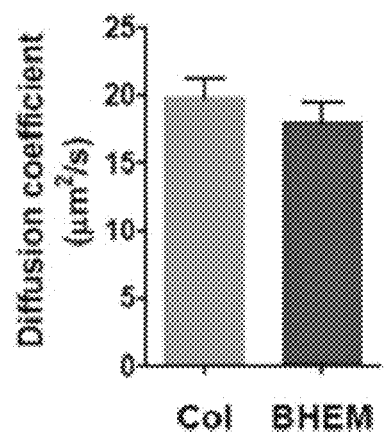
FIG. 8E relates to the characteristics of the collagen I (Col) and brain hybrid extracellular matrix (BHEM) hydrogels, and shows the diffusion coefficient of a 70 kDa fluorescein isothiocyanate labeled-dextran (FITC-dextran) probe.
Figure 8F:
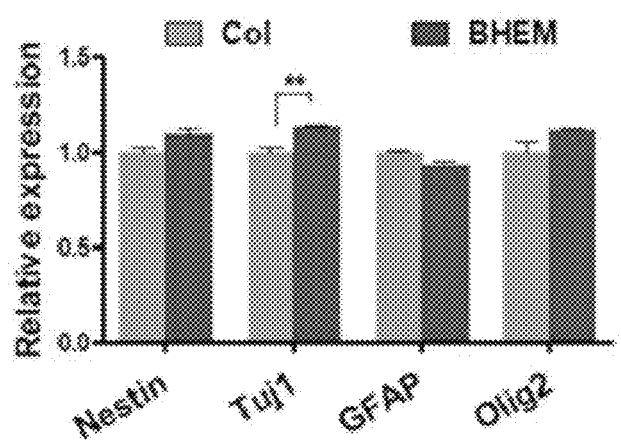
FIG. 8F relates to the characteristics of the collagen I (Col) and brain hybrid extracellular matrix (BHEM) hydrogels, and shows quantitative reverse transcriptase chain reaction (qPCR) analysis to quantify neural stem cell differentiation after 5 days of culture in the Col and BHEM hydrogels (n=3, **p<0.01 compared to Col group).
Figure 8G:
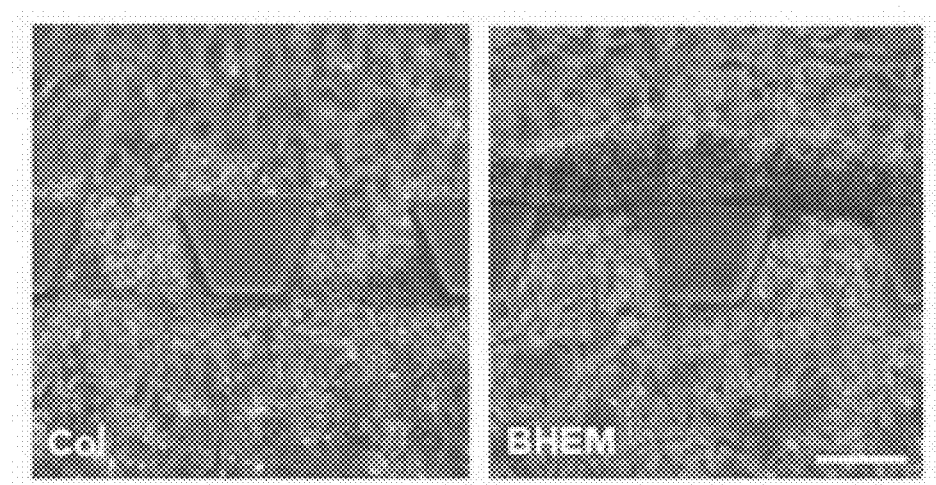
FIG. 8G relates to the characteristics of the collagen I (Col) and brain hybrid extracellular matrix (BHEM) hydrogels, and shows optical images of the Col and BHEM hydrogels after 5 days of co-culture of human NSC and brain endothelial cells (EC) in an hNVU chip.
Figure 8H:
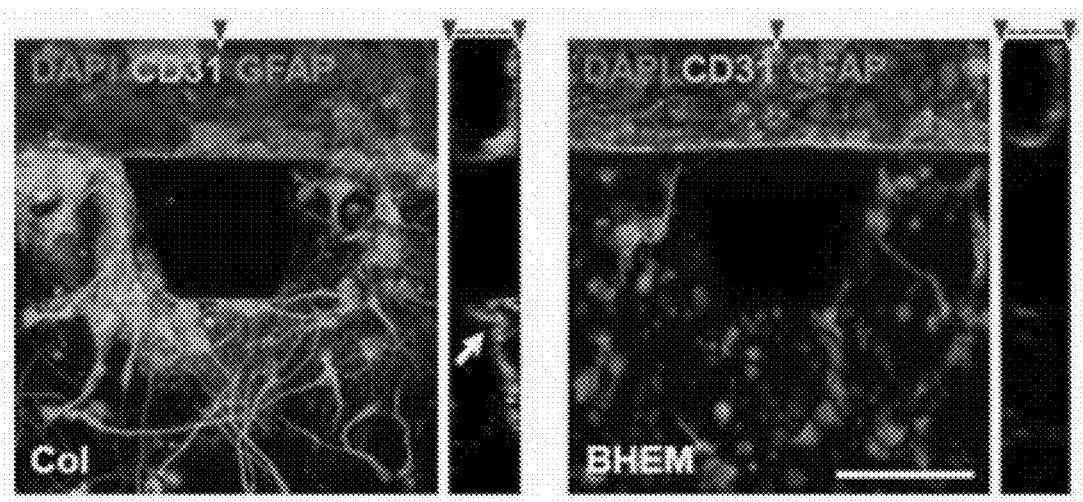
FIG. 8H relates to the characteristics of the collagen I (Col) and brain hybrid extracellular matrix (BHEM) hydrogels, and shows immunostaining of human EC (CD31, green) and human NSC-derived astrocytes [glial fibrillary acidic protein (GFAP), red] after 5 days of co-culture in the Col and BHEM hydrogels in hNVU chips. The scale bar represents the 100 μm.

A brain ECM-mimicking hydrogel was applied to 3D culture of human NSCs in an hNVU chip. Surface coating of microchannels with poly-L-lysine (PLL) and collagen promoted efficient formation of an EC monolayer in an upper channel (FIG. 6). For 3D culture in a central channel, the present inventors used a hybrid hydrogel of collagen I (Col), which is one of the highly concentrated ECM components in the brain, and HA; and the hydrogel was named Brain Hybrid ECM (BHEM) hydrogel. A 3D Col hydrogel for NSC culture in the central channel collapsed because an HA-free Col hydrogel contracted significantly and was unable to withstand the EC layer formed on the upper channel (FIG. 7). Therefore, the 3D Col hydrogel was supplemented with HA to enhance mechanical properties. HA was modified with a catechol group to improve the hydrogel adhesion. It is expected that as the oxidized catechol group had a large binding affinity to proteins and peptides, the catechol modification would increase the interaction with Col in the hybrid hydrogel to promote the formation of an integrated polymer network. Due to the expansion properties of an HA (HA-CA) hydrogel cross-linked with catechol in the presence of water, the BHEM hydrogel formed at a higher ratio of Col to HA-CA protruded the EC layer located on the upper channel (FIG. 7). An optimal ECM composition (Col: 3.7 mg/ml and HA-CA: 7.1 mg/ml) for maintaining both the intact EC layer and the 3D hydrogel structure containing NSC was found. The elastic modulus at a frequency of 1 Hz of the optimized BHEM hydrogel was significantly higher than that of the Col hydrogel (380.58±16.99 Pa and 96.48±10.65 Pa, respectively) (FIG. 8A and FIG. 8B). In comparison of the expansion properties of the hydrogels under physiological conditions [phosphate buffered saline (PBS) at 37° C.], the Col hydrogel exhibited significant contraction, weight loss and structural deformation, whereas the BHEM hydrogel maintained its volume and 3D structure (FIG. 8C). The diffusion coefficient (D) of the BHEM hydrogel decreased slightly but not significantly compared to that of the Col hydrogel (FIG. 8D and FIG. 8E), which indicates that there was no substantial difference in molecular diffusion between the BHEM and Col hydrogels. Therefore, nutrient supply and gas exchange may not be affected by HA supplementation. The BHEM and Col hydrogels showed different mechanical and expansion properties, but the differentiation profile of human fetal NSCs in the both 3D hydrogels did not change significantly, as confirmed by similar levels of neuronal and glial lineage differentiation markers. (FIG. 8F). After co-culture with NSC and EC for 5 days, the BHEM hydrogel retained the EC layer on a lateral channel, whereas the Col hydrogel contracted, resulting in the collapse of the EC layer in the 3D hydrogel region near the posts (FIG. 8G and FIG. 8H). These data indicate that BHEM hydrogel can provide a 3D brain-mimicking microenvironment with brain ECM components and improved mechanical properties for the successful establishment of the hNVU chip system.

Figure 9A:
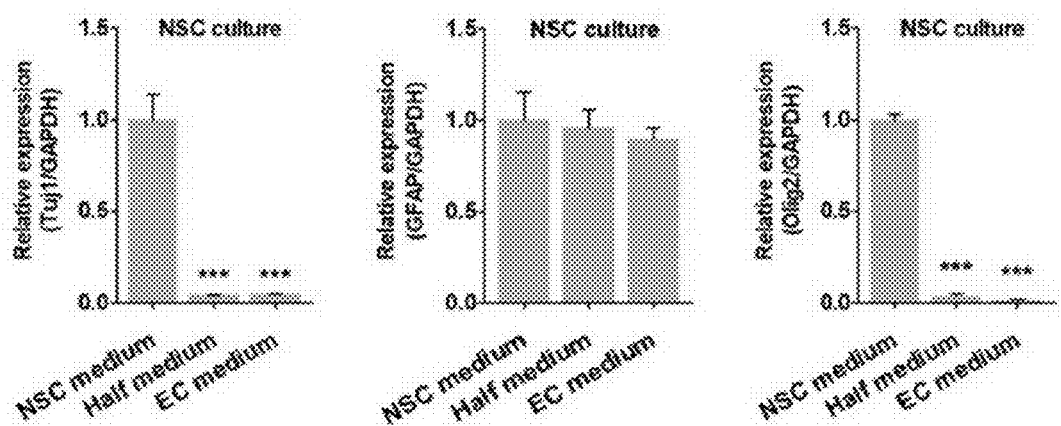
FIG. 9A relates to the effect of medium conditions on NSC, and shows qPCR results for gene expression of NSC differentiation markers (Tuj1, GFAP and Olig2) under three different medium conditions (NSC medium, EC medium and NSC+EC (0.5×) medium: 0.5λ basal medium and 0.5× factor for each cell type). The cells were cultured for 5 days prior to analysis 3 (n=3, ***$p<0.001$ compared to NSC medium, #$p<0.05$ compared to EC medium).
Figure 9B:
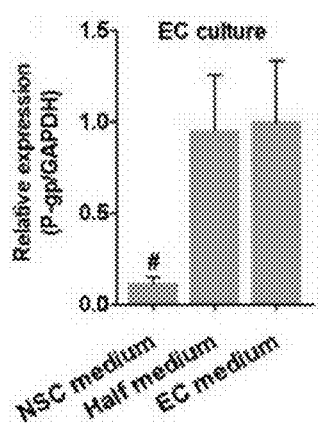
FIG. 9B relates to the effect of medium conditions on NSC, and shows qPCR results for gene expression of an EC marker (P-gp) under three different medium conditions (NSC medium, EC medium and NSC+EC (0.5×) medium: 0.5× basal medium and 0.5× factor for each cell type). The cells were cultured for 5 days prior to analysis (n=3, ***$p<0.001$ compared to NSC medium, #$p<0.05$ compared to EC medium).

The present inventors optimized the medium conditions for co-culturing multiple cell types in an hNVU chip. To identify the optimized culture medium that supports the growth of all three cell types (EC, PC and NSC), expression of neuronal [nerve cell-specific Class III beta-tubulin (Tuj1)] and glial [glial fibrillary acidic protein (GFAP), oligodendrocyte transcription factor 2 (Olig2)] lineage markers in human NSC culture was quantitatively compared under various medium compositions. When an NSC medium and an EC medium were simply mixed at a ratio of 1:1 [NSC+EC (0.5×) medium: 0.5× basal medium and 0.5× supplementary factor for each cell type] and cultured under prepared medium conditions, the NSC differentiation efficacy of neurons to NSCs was significantly reduced (FIG. 9A). Expression of P-gp, which is an important marker for the multiple drug resistance of BBB, was significantly reduced in EC cultured in the NSC medium (FIG. 9B). Therefore, the medium composition was further optimized for supplementary factors for each cell type.

Figure 10A:
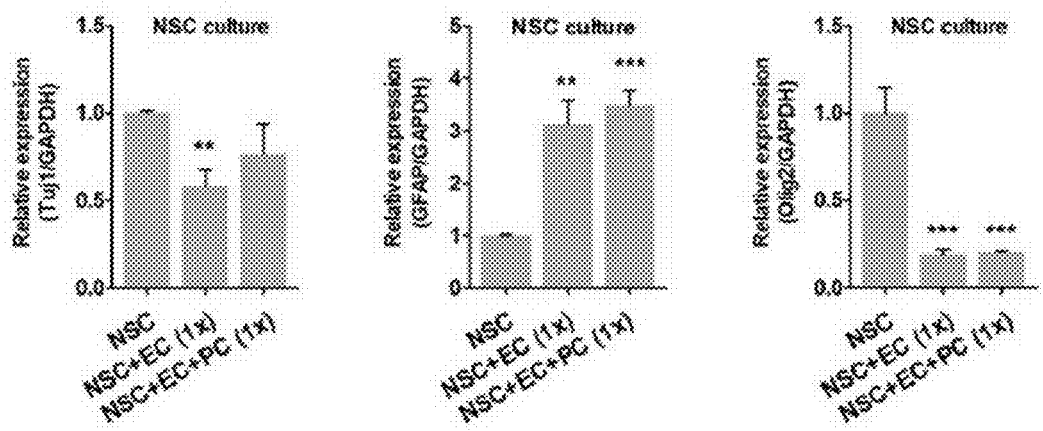
FIG. 10A shows the optimization of a medium for hNVU chip culture, and shows NSC differentiation markers under three different medium conditions [NSC medium, NSC+EC (1×) medium: 0.5× basal medium and 1× factor for each cell type, and NSC+EC+PC(1×) medium: 0.5× basal medium for NSC and EC and 1× factor for all the three cell types]. All the cells were cultured for 5 days prior to analysis.
Figure 10B:
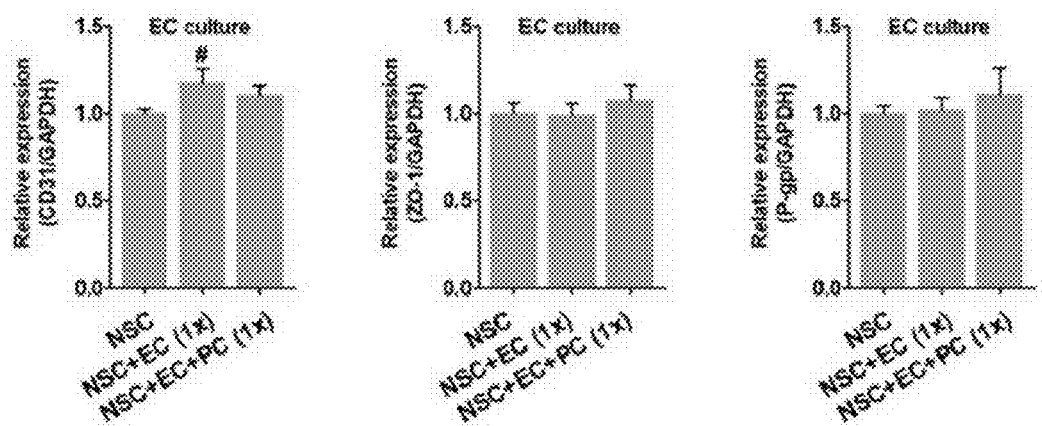
FIG. 10B shows the optimization of a medium for hNVU chip culture, and shows qPCR results for gene expression of an EC marker under three different medium conditions [NSC medium, NSC+EC(1×) medium: 0.5× basal medium and 1× factor for each cell type, and NSC+EC+PC(1×) medium: 0.5× basal medium for NSC and EC and 1× factor for all the three cell types] (n=3, $p<0.01$ and *$p<0.001$ compared to NSC medium, and #$p<0.05$ compared to EC medium). All the cells were cultured for 5 days prior to analysis.
Figure 10C:
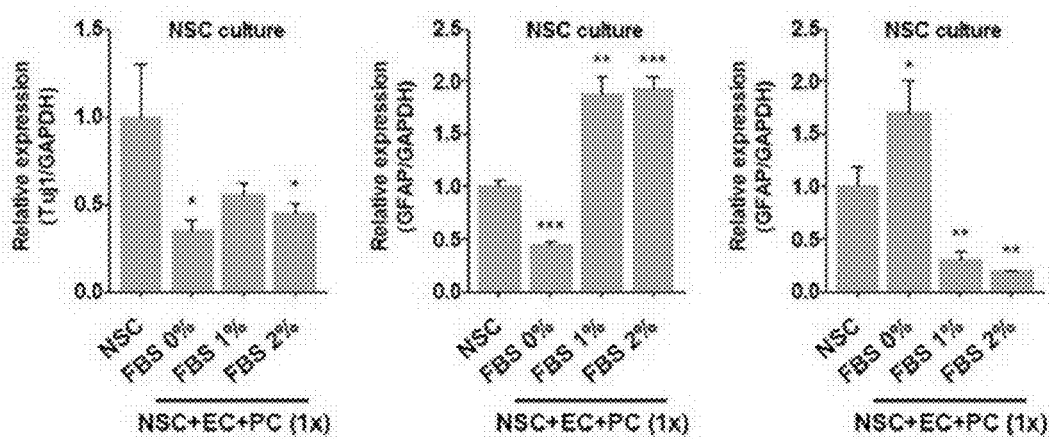
FIG. 10C shows the optimization of a medium for hNVU chip culture, and compares NSC+EC+PC(1×) mediums with different serum concentrations for NSC differentiation under three different medium conditions [NSC medium, NSC+EC (1×) medium: 0.5× basal medium and 1× factor for each cell type, and NSC+EC+PC(1×) medium: 0.5× basal medium for NSC and EC and 1× factor for all the three cell types] (n=3, *$p<0.05$, $p<0.01$ and *$p<0.001$ compared to NSC medium). All the cells were cultured for 5 days prior to analysis.

Neuronal differentiation of NSC was also reduced in the modified NSC medium conditions [NSC+EC(1×) medium: 0.5× basal medium with each 1× supplementary factor, NSC+EC+PC(1×) medium: 0.5× basal medium for NSC and EC with 1× supplementary factors for 3 cell types], but NSC maintained a certain level of differentiation potential for neurons (50% to 70% compared to the differentiation potential in the NSC medium) (FIG. 10A). NSC differentiation into astrocytes was significantly improved by these modified NSC medium conditions. Although expression of the oligodendrocyte marker (Olig2) was significantly reduced under these conditions, optimization of medium conditions was not considered because the oligodendrocyte is not a major component of the neurovascular unit. EC was not significantly affected by the modified culture conditions as shown by similar expression levels of endothelial junction molecules (CD31 and Zonula occludens-1; ZO-1) and efflux pumps (P-gp) in the EC and the modified NSC medium [NSC+EC(1×) and NSC+EC+PC(1×)] (FIG. 10B). When the NSC+EC+PC(1×) medium supplemented with different fetal bovine serum (FBS) concentrations (0%, 1% and 2%) was tested for NSC differentiation, the presence of 1% and 2% FBS did not affect neuronal differentiation but significantly increased astrocytic differentiation (FIG. 10C). Therefore, an NSC-EC-PC(1×) medium supplemented with 1% FBS compatible with all the three cell types was used for further experiments.

Figure 11A:
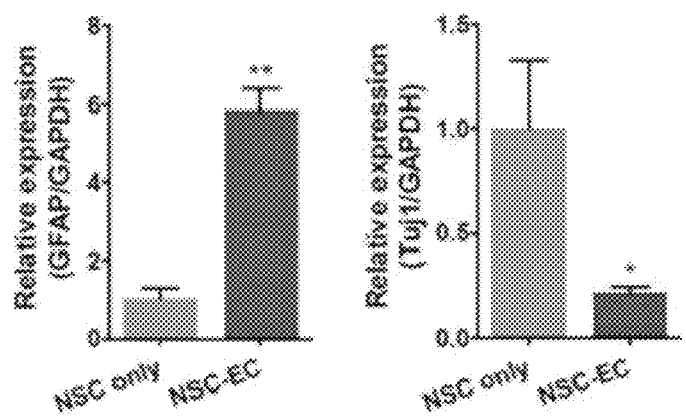
FIG. 11A shows the generation of neurovascular units with BBB through NSC differentiation in hNVU chips, and shows qPCR analysis to compare NSC differentiation between an NSC-only group and an NSC-EC coculture group with neurons (Tuj1) and astrocytes (GFAP) (n=3, *$p<0.05$ and **$p<0.01$ compared to NSC-only group). The scale bars represent 100 μm (white) and 50 μm (red).
Figure 11B:
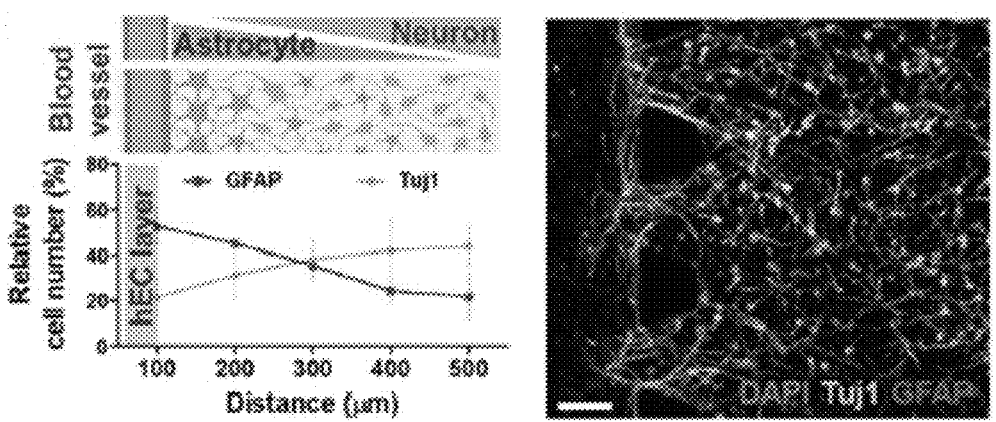
FIG. 11B shows the generation of neurovascular units with BBB through NSC differentiation in the hNVU chips, and shows immunostaining and immunostained image quantification for Tuj1 and GFAP to investigate an NSC differentiation pattern based on proximity to an EC layer (n=3, biological replicates=3). The scale bars represent 100 μm (white) and 50 μm (red).
Figure 11C:
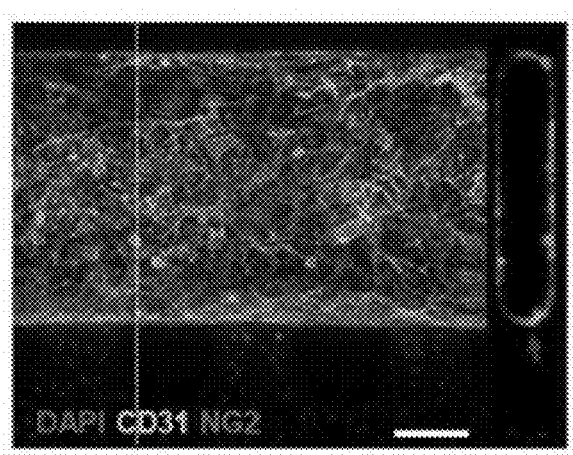
FIG. 11C shows the generation of neurovascular units with BBB through NSC differentiation in the hNVU chips, and shows a confocal fluorescence image of pericytes (PC; NG2, red) surrounding EC (CD31, green) in an EC monolayer (red arrow). The scale bars represent 100 μm (white) and 50 μm (red).
Figure 11D:
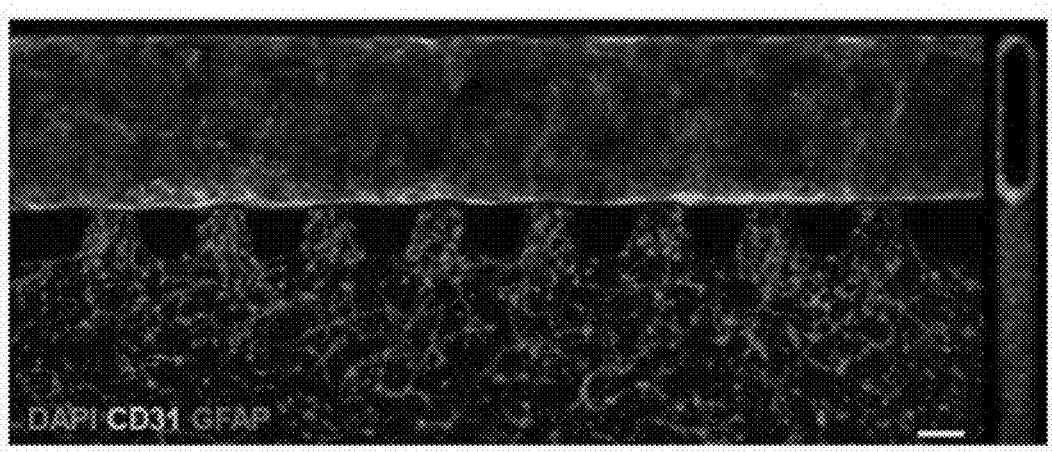
FIG. 11D shows the generation of neurovascular units with BBB through NSC differentiation in the hNVU chips, and shows a vascular end feet-like structure of GFAP-positive astrocytes differentiated from NSC. The scale bars represent 100 μm (white) and 50 μm (red).
Figure 11E:
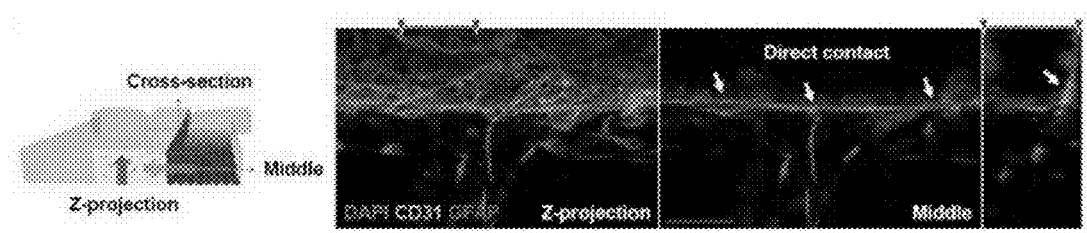
FIG. 11E shows the generation of neurovascular units with BBB through NSC differentiation in the hNVU chips, and shows a confocal image showing direct contact between GFAP positive astrocytes differentiated from NSC and an EC monolayer (white arrow). The scale bars represent 100 μm (white) and 50 μm (red).
Figure 12A:
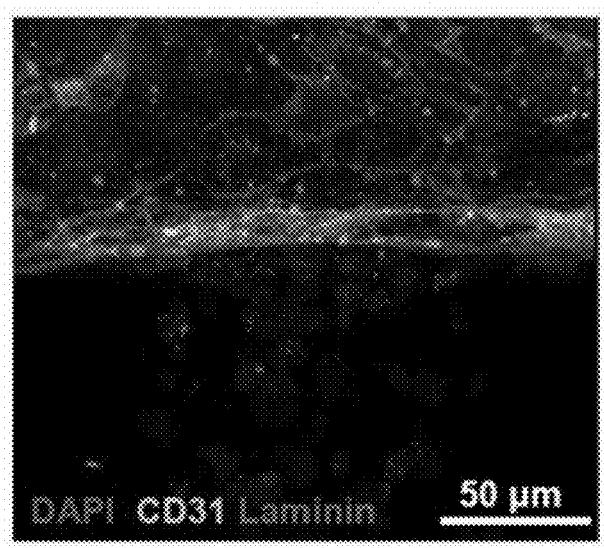
FIG. 12A shows immunostaining for glia cell differentiation and basal deposition in an hNVU chip, and shows an immunofluorescence image of laminin deposition on an EC monolayer (CD31) on day 5. The scale bar represents 50 μm.
Figure 12B:
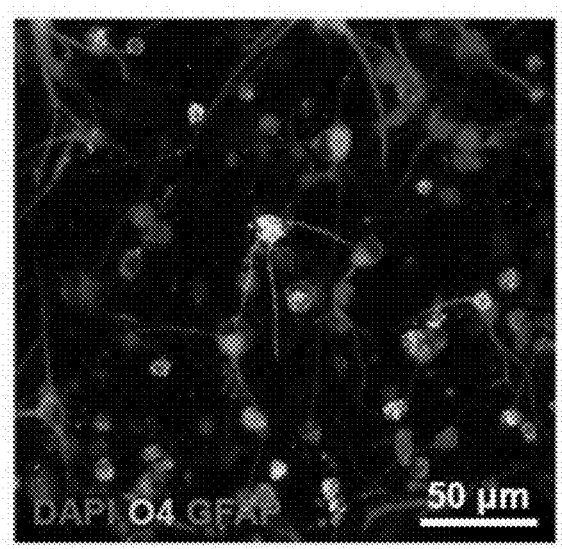
FIG. 12B shows immunostaining for glia cell differentiation and basal deposition in the hNVU chip, and shows immunofluorescence staining of glial lineage cells differentiated from NSC (oligodendrocyte marker: O4, GFAP marker: GFAP) after 5 days of culture in the hNVU chip system. The scale bar represents 50 μm.

Example 3: Reconstruction of Neurovascular Unit with BBB Structure in hNVU Chip hNVU was established in the microfluidic chip by inducing in situ human NSC differentiation through co-culture with EC under the optimized medium and hydrogel conditions. The direction of stem cell differentiation can be controlled by soluble factors secreted from neighboring cells. Co-culture of human fetal NSCs with human brain ECs enhanced glial differentiation of NSCs, but reduced neuronal differentiation caused by the paracrine effect of secretion of EC (FIG. 11A). This differentiation pattern was similar to the pattern observed in the previous studies of the present inventors. Co-culture of NSCs and ECs in different compartments of the microfluidic device induced spatially controlled NSC differentiation. GFAP-positive astrocytes increased significantly in differentiated NSCs near the EC layer (FIG. 11B). However, Tuj1-positive neurons increased in the NSC population far from the EC layer. In the brain, the PC surrounds the vascular basement membrane, which is connected to astrocyte vascular end feet. PC is an important component of a functional BBB for vascular permeability and blood flow regulation. It has been reported that PC secretes laminin and induces EC to secrete a basement membrane component. To fabricate an hNVU chip, PC and EC were seeded sequentially in an upper channel, causing the formation of a tubular EC monolayer on the luminal surface of the channel and localization of the PC under the EC layer, and were brought into direct contact with the other (FIG. 11C). When EC and PC were co-cultured in the chip, an important basement membrane protein (laminin) precipitated under the vascular layer by mimicking a base plate of BBB (FIG. 12A). In this hNVU chip, the EC formed a vascular-like structure with a uniform monolayer, and near the EC, NSC was mostly differentiated into astrocytes (FIG. 11D). GFAP-positive astrocytes mimicked the cerebral vascular astrocyte vascular end feet, stretched their glial dendrites towards the EC layer and made direct contact around the vascular structure (FIG. 11D and FIG. 11E). Differentiation of human NSCs into oligodendrocytes, which play an important role in medullization in the central nervous system, was sometimes observed in the 3D BHEM hydrogel of the microfluidic chip (FIG. 12B).

Example 4: Control of BBB Permeability in hNVU Chip

Figure 13A:
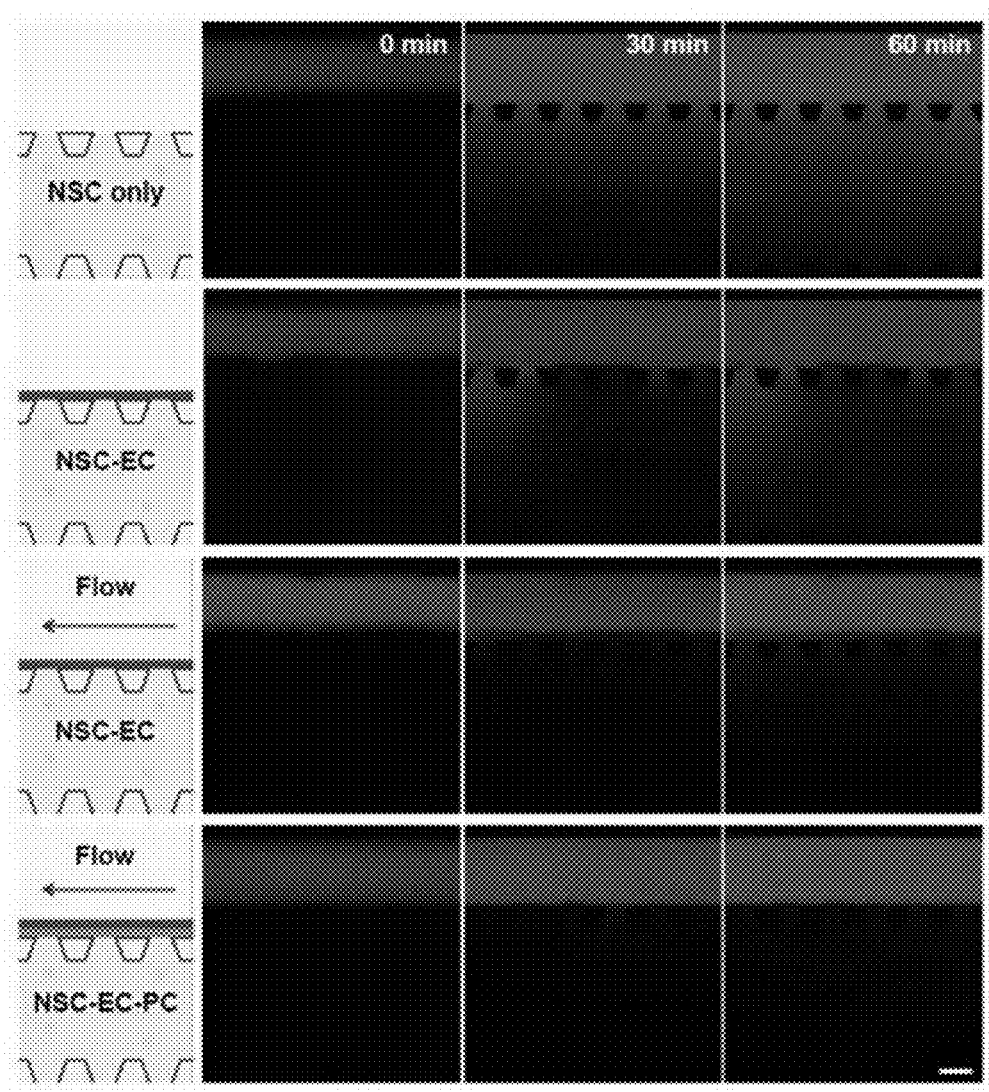
FIG. 13A shows the characteristics of BBB permeability in an hNVU chip, and shows images of 70 kDa FITC-dextran permeation under different chip conditions over time. The scale bar represents 200 μm.
Figure 13B:
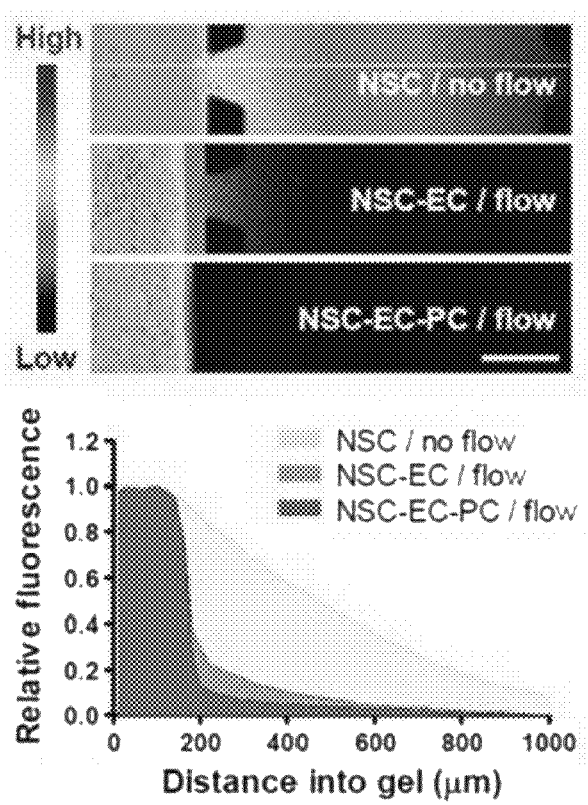
FIG. 13B shows the characteristics of BBB permeability in the hNVU chip, and shows the distribution of fluorescent dextran and its normalized fluorescence intensity along the white dotted line at the interface region between a 3D BHEM hydrogel and an EC monolayer in the hNVU chip. The scale bar represents 200 μm.
Figure 13C:
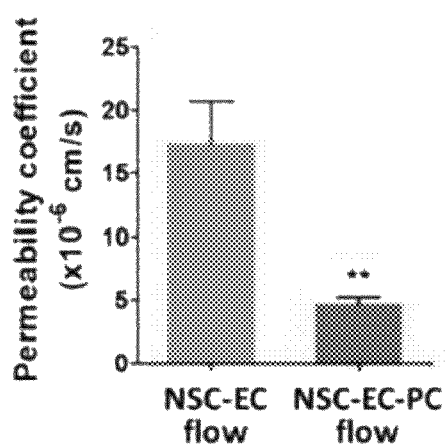
FIG. 13C shows the characteristics of BBB permeability in the hNVU chip, and shows the permeability coefficient of 70 kDa FITC-dextran in NSC-EC/flow and NSC-EC-PC/flow groups at 60 minutes (n=3, **$p<0.01$). The scale bar represents 200 μm.

Culture conditions (for example, co-culture, dynamic flow) can determine the permeability of a BBB unit as a diffusion barrier in an hNVU chip. To identify factors that control the function of the BBB, the present inventors monitored the barrier permeability using fluorescence-labeled dextran as a tracer under various culture environments. Permeability tests performed after 5 days of NSC seeding showed that an NSC monoculture group rapidly diffused 70 kDa fluorescein isothiocyanate (FITC)-labeled dextran (FITC-dextran) into a 3D BHEM hydrogel containing NSC, and also exhibited a gradual diffusion profile of fluorescence as shown in the drawings (FIG. 13A and FIG. 13B). Invasion of FITC-dextran through the EC layer in an NSC and EC co-culture group (NSC-EC) without medium flow was lower than that of an NSC-only group, but particularly near the post between an EC culture channel and a 3D NSC channel, the barrier was partially leaked (FIG. 13A and FIG. 13B). The medium flow provided shear stress to the EC layer and reduced leakage (NSC-EC/flow), but the permeability coefficient was still high at $17.32 \times 10^{-6}$ cm/s (FIG. 13A to FIG. 13C). Triple co-culture of NSC, EC and PC with dynamic flow (NSC-EC-PC/flow) significantly reduced the barrier permeability to $4.71 \times 10^{-6}$ cm/s without an apparent passage of FITC-dextran through the EC barrier (FIG. 13A to FIG. 13C), which indicates that the function of the BBB in the hNVU chip was improved.

Figure 14A:
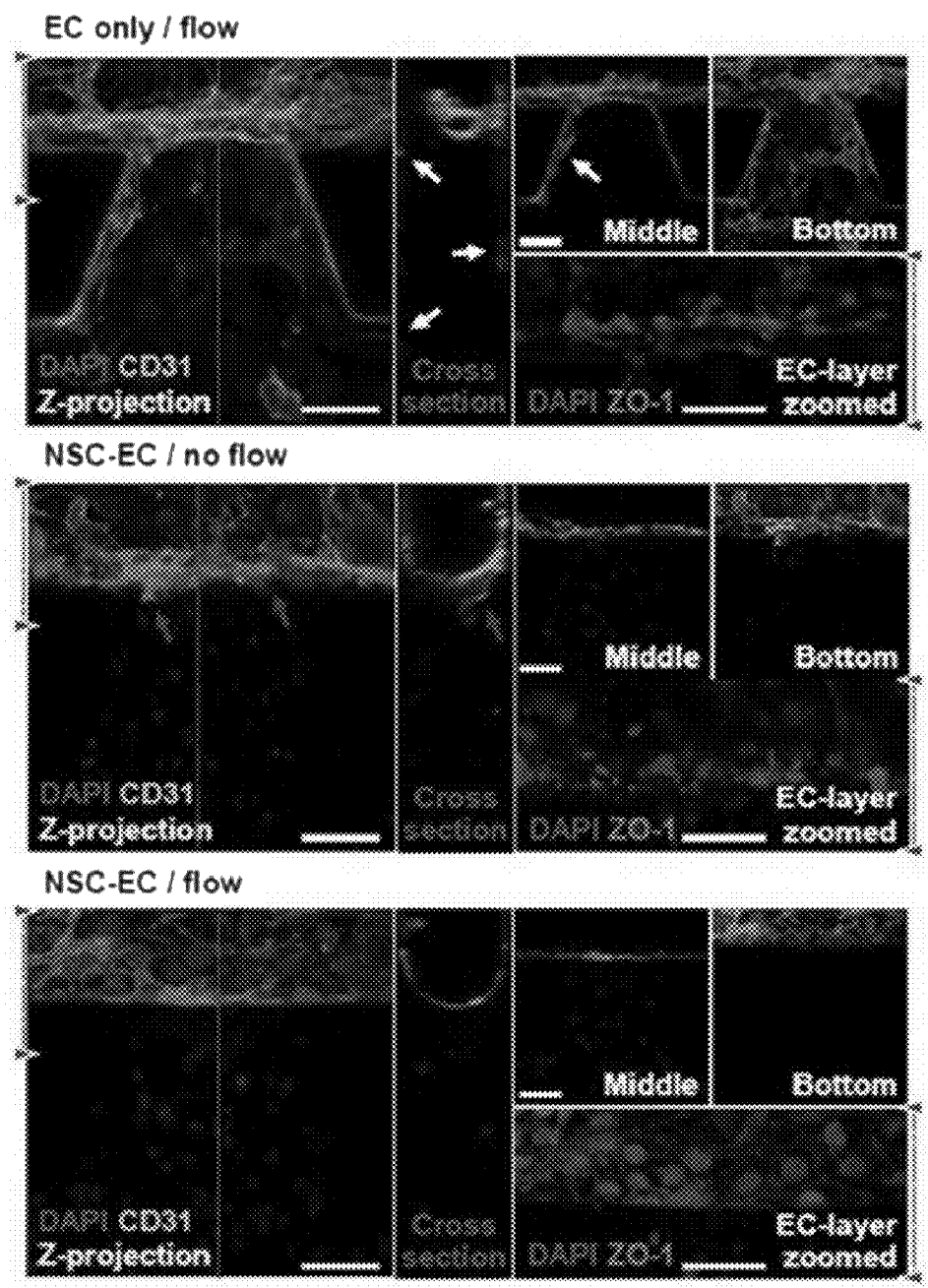
FIG. 14A shows a barrier function and physiological response of BBB in a hNVU chip, and shows EC morphology and tight junction formation on EC monolayers in the chip under different conditions. The white and red arrows indicate abnormal units of EC invasion and EC layer, respectively. The scale bars represent 50 μm (white) and 100 μm (red).
Figure 14B:
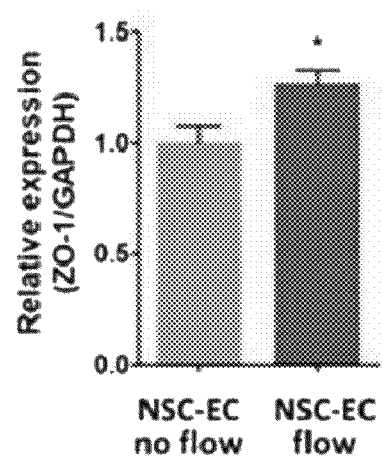
FIG. 14B shows the barrier function and physiological response of BBB in the hNVU chip, and shows gene expression of a tight junction marker ZO-1 in the hNVU chip (n representing an independent hNVU chip=3, *$p<0.05$). The scale bars represent 50 μm (white) and 100 μm (red).
Figure 15A:
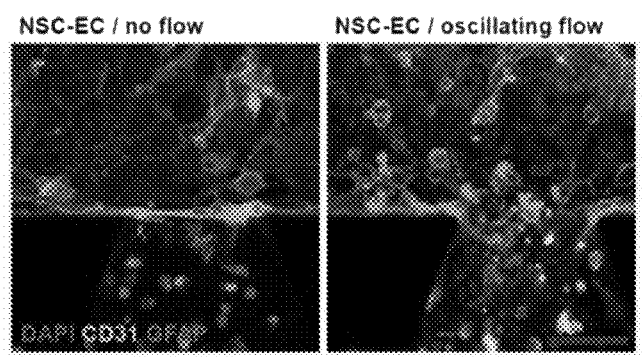
FIG. 15A shows abnormal EC morphology and an impaired barrier function of BBB in an hNVU chip under bidirectional medium flow conditions, and shows fluorescence images of BBB units in NSC-EC co-culture conditions with no flow (NSC-EC/no flow) for 5 days or with bidirectional flow (NSC-EC/oscillating flow) generated by an axial stirrer. The scale bars represent 50 μm (red) and 100 μm (white).
Figure 15B:
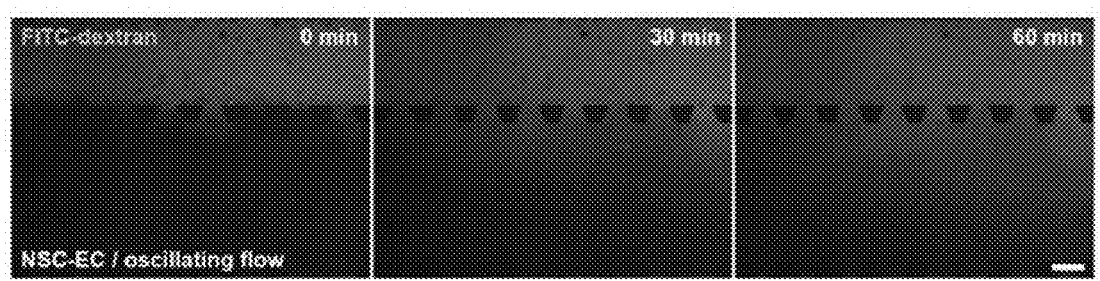
FIG. 15B shows the abnormal EC morphology and impaired barrier function of BBB in the hNVU chip under bidirectional medium flow conditions, and shows images of 70 kDa FITC-dextran permeation through an EC barrier in a chip with NSC-EC co-culture under oscillating flow conditions over time. The scale bars represent 50 μm (red) and 100 μm (white).

To explain possible reasons for the difference in permeability at the barrier of the hNVU chip due to co-culture and medium flow, the present inventors closely monitored the EC morphology and behavior in different culture environments. In an EC monoculture group, ECs did not form a monolayer along the channel but invaded into a 3D BHEM hydrogel matrix near the posts forming self-organized microvascular structures or reminiscent of angiogenesis (FIG. 14A, white arrows). In the NSC and EC co-culture groups without any mechanical stimulation (NSC-EC/no flow), ECs were formed but cells extruded from the layer were randomly distributed (FIG. 14A, red arrows). This irregular barrier was regarded as a cause of the leakage shown in FIG. 13A. Meanwhile, in the NSC and EC co-culture groups under fluid flow (NSC-EC/flow), ECs were organized on the channel and formed a solid monolayer (FIG. 14A). The tight junction protein ZO-1 was well distributed at the boundary between cells only in the co-culture group with flow (FIG. 14A). The expression level of ZSC-1 was also improved in the NSC-EC/flow group compared to the expression level in the NSC-EC/no flow group (FIG. 14B). Under bidirectional oscillating flow condition using a stirrer instead of a syringe pump, ECs showed abnormal morphology and invasion of FITC-dextran through the EC barrier increased significantly (FIG. 15A and FIG. 15B). These results indicate that EC needs strong mechanical stimulation and interaction with neighboring cells to provide a strong barrier function and suppress a leakage. Overall, the present inventors have found that shear stress and PC play an important role in controlling the integrity of the reconstructed BBB in a microfluidic brain model, as in real brain tissue.

Example 5: Function of BBB Reconstructed in hNVU Chip

Figure 14C:
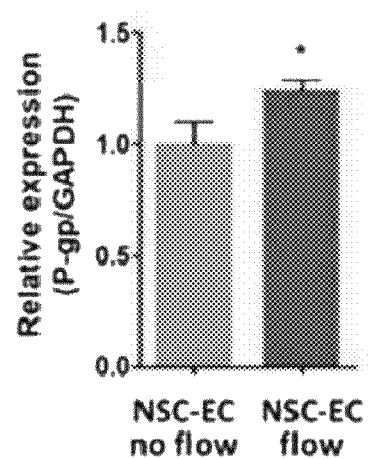
FIG. 14C shows the barrier function and physiological response of BBB in the hNVU chip, and shows gene expression of a multidrug efflux pump P-gp in the hNVU chip (n representing an independent hNVU chip=3, *$p<0.05$). The scale bars represent 50 μm (white) and 100 μm (red).
Figure 14D:
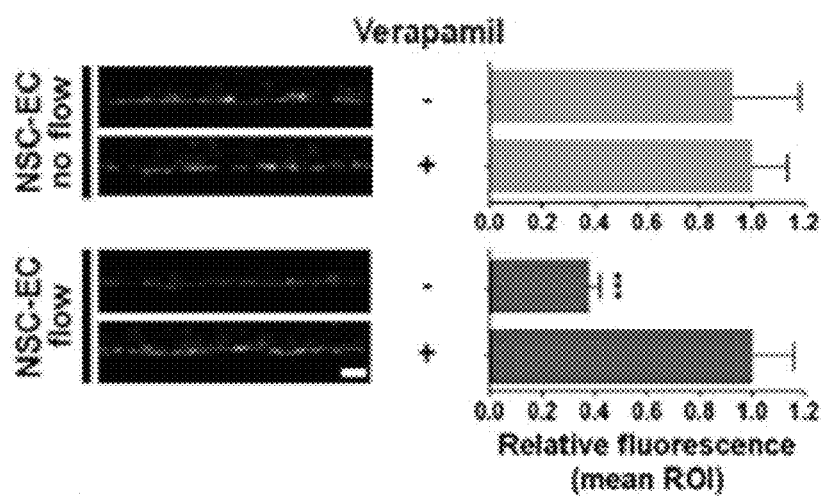
FIG. 14D shows the barrier function and physiological response of BBB in the hNVU chip, and shows a drug resistance test of BBB in the hNVU chip using a P-gp blocker verapamil. Fluorescence image quantification of accumulated calcein acetoxymethyl (calcein AM) was performed (n representing an independent hNVU chip=3, ***$p<0.001$) The scale bars represent 50 μm (white) and 100 μm (red).
Figure 14E:
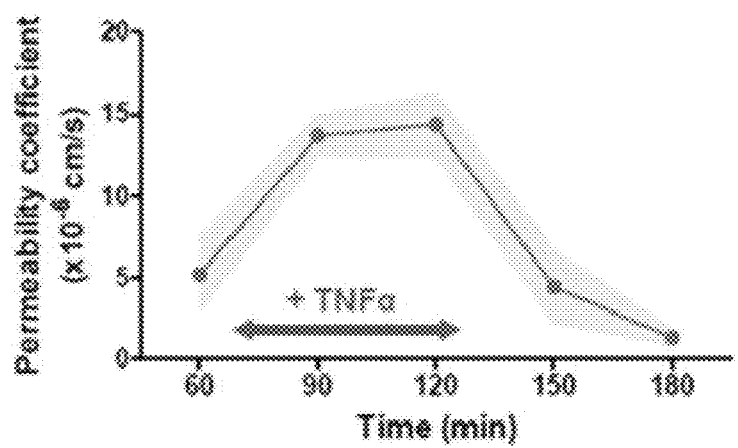
FIG. 14E shows the barrier function and physiological response of BBB in the hNVU chip, and shows calculated changes of permeability coefficient. The scale bars represent 50 μm (white) and 100 μm (red).
Figure 14F:
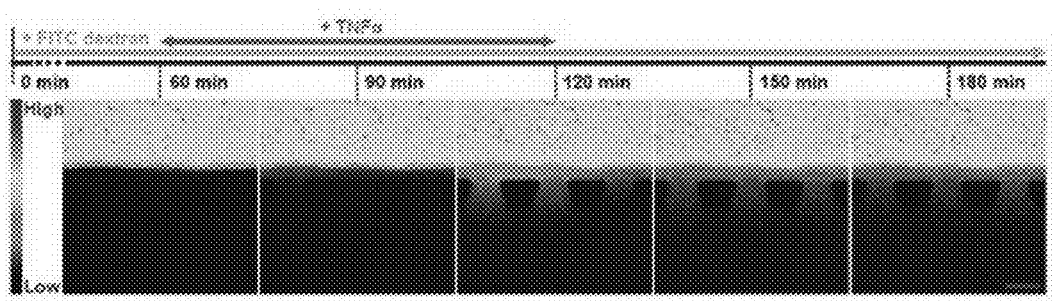
FIG. 14F shows the barrier function and physiological response of BBB in the hNVU chip, and shows images of 70 kDa FITC-dextran over time during exposure to 20 ng/ml tumor necrosis factor-alpha (TNF-α) (n representing an independent hNVU chip=3). The scale bars represent 50 μm (white) and 100 μm (red).

The present inventors have checked whether a BBB with tight junction reconstructed in an hNVU chip under optimal conditions exhibits a physiological barrier function. Expression of P-gp as one of the efflux pumps important for the BBB function was up-regulated in the NSC-EC/flow group (FIG. 14C), which can indicate the improved efflux pump functionality of the BBB in this group. Non-fluorescent acetoxymethyl calcein (calcein AM) can be converted into fluorescent calcein when transported into living cells and then pumped from the cells by P-gp. The addition of calcein AM to the BBB in the hNVU chip without flow resulted in constantly high fluorescence intensity in the brain EC layer, regardless of treatment of P-gp with a chemical inhibitor (verapamil) (FIG. 14D), and showed that the BBB formed without flow can be somewhat immature and cannot efficiently reflux the calcein AM molecules. Conversely, as confirmed by the limiting intensity of a fluorescence signal, the BBB, which contains a more rigid and complete EC layer with tight junction formed by dynamic flow, blocked the accumulation of calcein AM molecules in the EC layer due to the enhanced efflux pump function of the EC (FIG. 14D). In the NSC-EC/flow group, the fluorescence intensity of calcein AM increased significantly only in the EC layer after verapamil treatment (FIG. 14D). These results indicate that the hNVU chip system has a physiologically active barrier to incoming drugs, which is one of the most important features of the functional BBB. In the hNVU chip, when the BBB was exposed to a tumor necrosis factor-alpha (TNF-α), which is a pro-inflammatory cytokine known to increase the BBB permeability by a response of the EC layer (NSC-EC-PC/flow group) to microbial infection, the permeability of the EC layer to 70 kDa FITC-dextran was significantly increased (about 2.8 times) (FIG. 14E). After 120 minutes, the TNF-α was removed by medium exchange and then, the BBB layer quickly restored its permeability (FIG. 14E and FIG. 14F). These results revealed that in this hNVU chip system, BBB exhibits a physiological response to cytokine and serves as a functional barrier which is reversibly active.

Figure 16A:
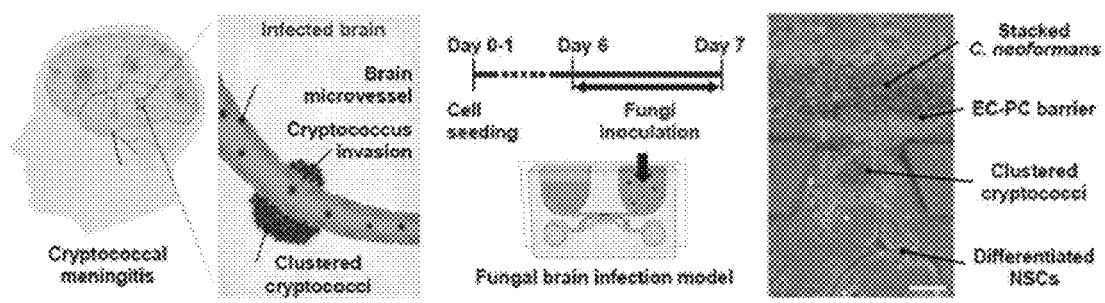
FIG. 16A relates to a fungal brain infection model using hNVU chips, and shows a schematic diagram of cryptococcal meningitis and an experimental set-up of an hNVU chip for fungal infection model. The scale bars represent 20 μm (yellow), 50 μm (white) and 100 μm (red).

Example 6: hNVU Chip as Efficient In Vitro Model for Monitoring Microbial BBB Invasion In order to demonstrate the practical utility of the hNVU chip, the present inventors used the hNVU chip to investigate the brain infection mechanism of the fungal pathogen *C. neoformans*, which is known worldwide to infect the brain and cause fatal meningitis in individuals with weakened immunity (FIG. 16A). These fungal pathogen efficiently cross the BBB and cluster in the brain tissue near the BBB and are located in the perivascular space of the posterior capillary veins. The vertical chip set-up allowed fungal cells to efficiently contact the EC. After 1 day of inoculation into an upper channel of the hNVU chip (NSC-EC-PC/flow group), some *C. neoformans* cells (H99 strain) were observed as accumulated in the EC-PC vascular layer across the BBB barrier of the hNVU chip (FIG. 16A). Interestingly, *C. neoformans* formed a cluster under the vasculature according to invasion of the EC layer, which is

Figure 17A:
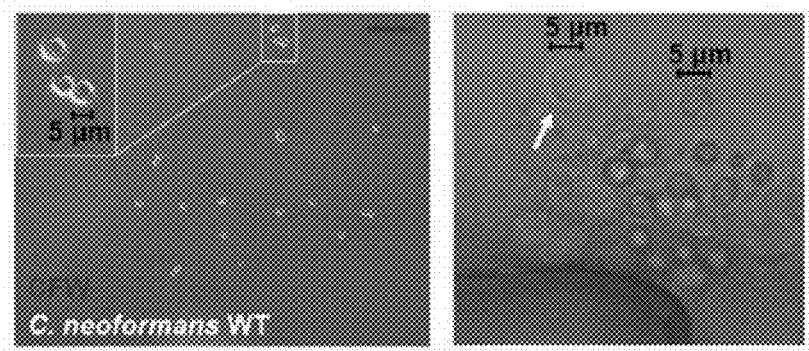
FIG. 17A relates to fungal behaviors and BBB permeation in an hNVU chip, and shows an image (left) of *C. neoformans* injected into a blank chip and an image (right) of *C. neoformans* after 1 day of inoculation. The white arrows indicate large *Cryptococcus* caused by slow division. The scale bars represent 100 μm (white) and 50 μm (red).

*C. neoformans* infection and repeats the morphology of real brain tissue. Live imaging of calcofluor white (CFW)-labeled *C. neoformans* cells inoculated into the hNVU chip showed that fungal cells first accessed the EC layer and then diffused faster near the 3D brain matrix (BHEM), and eventually penetrated the vascular layer. In the later parts of the live imaging, the CFW-fluorescence intensity tagged with chitin in the fungal cell walls was heterogenized due to fungal cell division during infection (FIG. 17A).

Figure 16B:
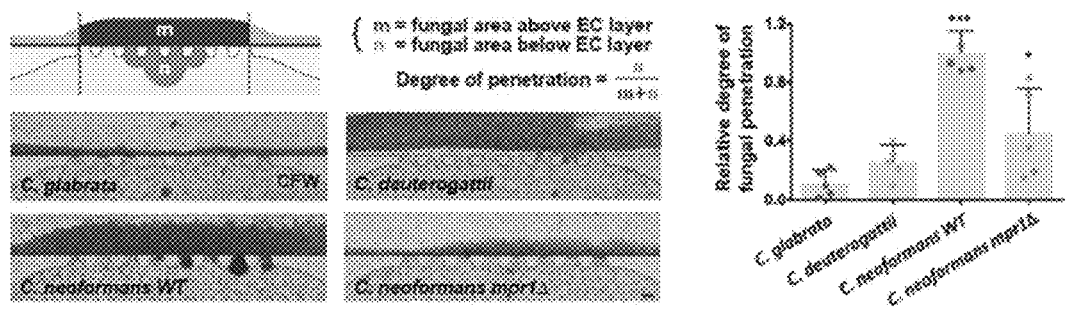
FIG. 16B relates to the fungal brain infection model using the hNVU chips, and shows BBB permeation and invasion of four different fungi on the hNVU chips (n=5, technical replicates=2-3, *Candida glabrata*-infected groups *p<0.05 and ***p<0.001). The scale bars represent 20 μm (yellow), 50 μm (white) and 100 μm (red).

To quantify the ability of *C. neoformans* to invade a BBB, the present inventors defined the level of BBB invasion as follows (FIG. 16B; upper panel): CFW-stained fungal area (n) under the EC layer was divided by the total CFW-stained fungal area (m+n) above and under the EC layer. The ability to invade a BBB by three different strains including: 1) *Candida glabrata* (BG2 strain), which is not a common fungal meningitis pathogen; 2) *Cryptococcus deuterogattii* (R265 strain), which is one of the pathogenic *Cryptococcus* species primarily targeting the lungs, not the brain during systemic host infection; and 3) *C. neoformans* mpr1Δ mutant, which is defective in BBB invasion and brain infection due to deletion of metalloprotease MPR1, was compared to that of the wild type (WT) strain *C. neoformans* H99. As expected, the *C. glabrata* BG2 strain did not penetrate the vascular barrier of the hNVU chip (FIG. 16B). The *C. deuterogattii* R265 strain had a lower BBB invasion level compared to the invasion level exhibited by the *C. neoformans* H99 strain (FIG. 16B). In particular, unlike the *C. glabrata* and *C. deuterogattii* cells uniformly stacked in the entire EC layer, the *C. neoformans* WT cells were more clustered over the EC layer near the 3D brain unit and passed through the BBB barrier (FIG. 16B). The *C. neoformans* mpr1Δ mutants were also clustered near the 3D BHEM region, but showed much lower invasion ability than the *C. neoformans* H99 strain (FIG. 16B).

Figure 16C:
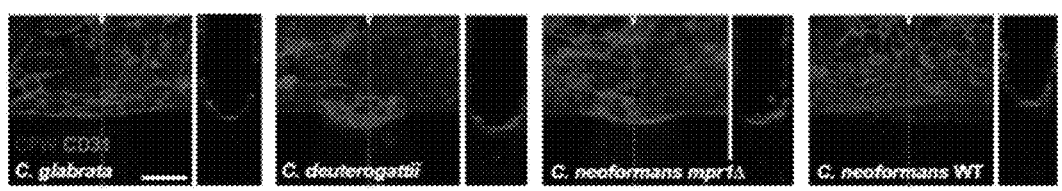
FIG. 16C relates to the fungal brain infection model using the hNVU chips, and shows immunofluorescence images of fungi labeled with human EC layer (CD31, red) and Calcofluor White (CFW) after 1 day of inoculation with fungi on the hNVU chips. The scale bars represent 20 μm (yellow), 50 μm (white) and 100 μm (red).
Figure 16D:
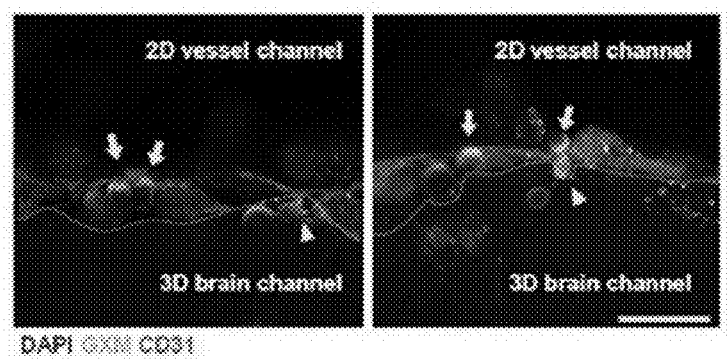
FIG. 16D s relates to the fungal brain infection model using the hNVU chips, and shows confocal images of wild-type *Cryptococcus neoforman* penetrating the EC layer after 1 day of inoculation. Cryptococci [glucuronoxylomannan (GXM), green] penetrating the EC and cryptococci (yellow arrows) penetrating the EC are indicated in a single z-axis image. The white dotted line indicates the presumed location of the EC layer. The scale bars represent 20 μm (yellow), 50 μm (white) and 100 μm (red).
Figure 16E:
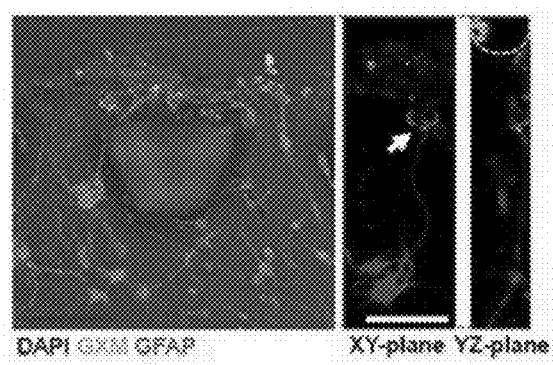
FIG. 16E relates to the fungal brain infection model using the hNVU chips, and shows cryptococci (GXM, green) (red) interacting with GFAP-positive astrocytes. The white arrows indicate direct contact between NSC-derived astrocytes and fungi. The white dotted line indicate the presumed location of the EC layer. The scale bars represent 20 μm (yellow), 50 μm (white) and 100 μm (red).
Figure 17B:
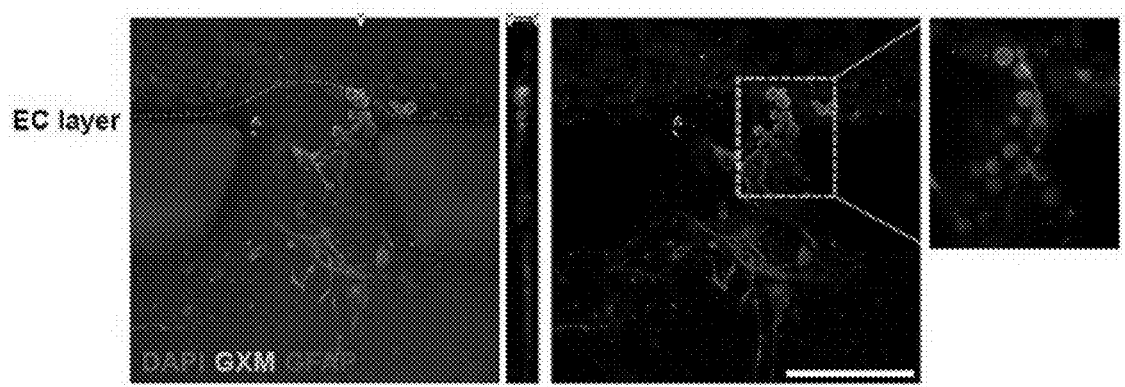
FIG. 17B relates to the fungal behaviors and BBB permeation in the hNVU chip, and shows confocal images of the interaction of GFAP-positive astrocytes and wild-type *C. neoformans* cells (GXM) penetrating into a 3D brain-mimicking matrix. The scale bars represent 100 μm (white) and 50 μm (red).

After invading the BBB in the hNVU chip, the *C. neoformans* clustered under the EC layer. In the immunostaining images, few cells were seen on the vascular layer as they were swept from the channel by washing during a staining process (FIG. 16C). However, a number of *C. neoformans* H99 strain cells were clustered under the CD31-stained EC layer (FIG. 16C). Unlike conventional BBB models each consisting of horizontal EC barriers, the hNVU chip has vertical EC barriers, which allows fungal invasion to be observed directly. Confocal images of the *C. neoformans* WT cells penetrating the EC layer in a single z-plane showed that the fungal cells were located mainly near the nucleus in the EC (FIG. 16D, yellow arrows). There was no noticeable damage to the *Cryptococcus* cells after BBB invasion (FIG. 16D, yellow arrowheads). The invaded and clustered *Cryptococcus* cells were shown to directly contact GFAP-positive astrocyte vascular end feet derived from NSC (FIG. 16E, white arrow and FIG. 17B). In particular, in the BBB, the EC had irregular morphology upon *C. neoformans* infection, but *C. glabrata* infection did not change the morphology of the EC (FIG. 16C). Nevertheless, there was no noticeable dissolution in the vascular layer during *C. neoformans* infection. Overall, the data of the present inventors clearly demonstrate that the hNVU chip models the selective BBB invasion process of fungal meningitis pathogens.

Example 7: Multi-Organ hNVU Chip for Monitoring Microbial Neuroaffinity

Figure 2A:
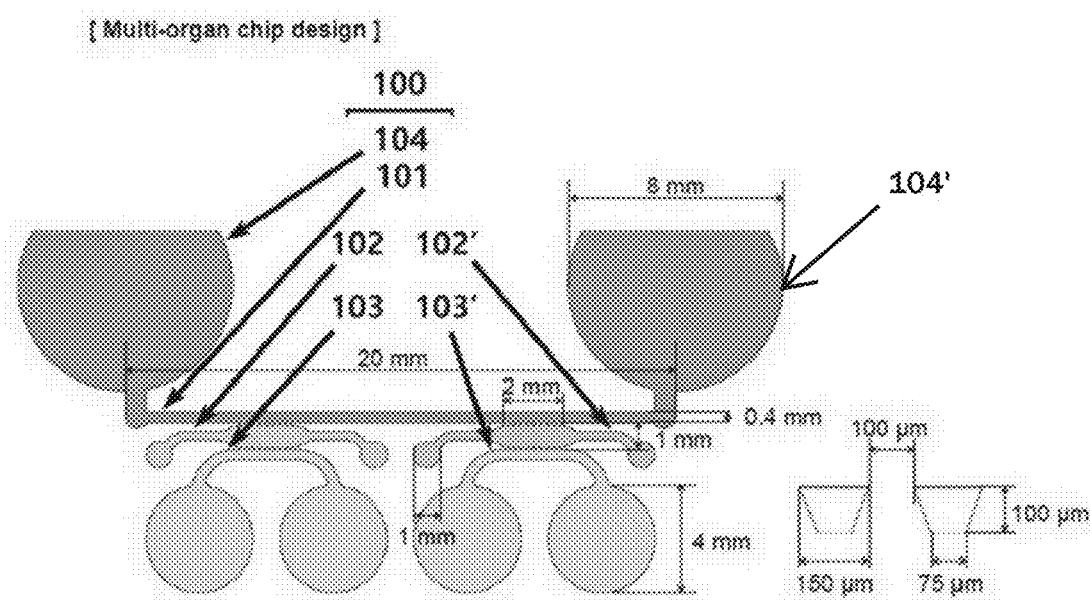
FIG. 2A relates to the design and dimensions of a multi-organ hNVU chip, and shows the design and dimensions of a microfluidic device for multi-organ hNVU chip.
Figure 2B:
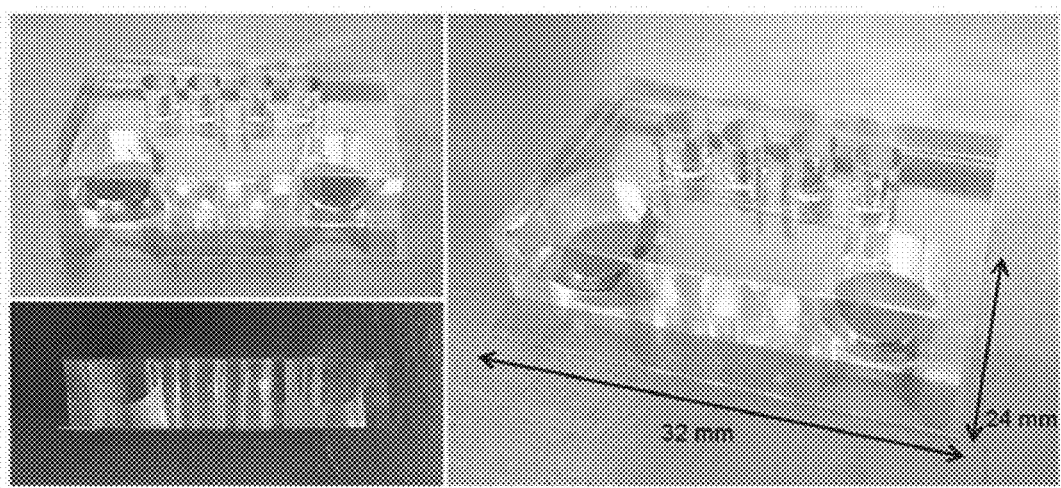
FIG. 2B relates to the design and dimensions of the multi-organ hNVU chip, and shows photos of a microfluidic device for multi-organ hNVU chip.
Figure 18A:
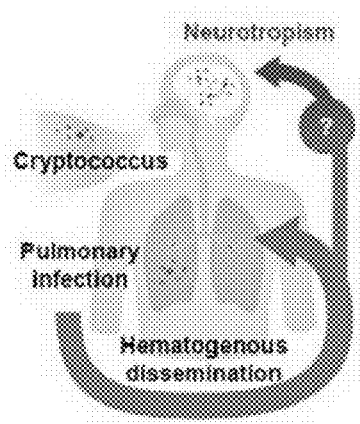
FIG. 18A relates to a multi-organ hNVU chip model for fungal neuroaffinity studies, and shows a schematic diagram of a cryptococcal infection route.
Figure 18B:
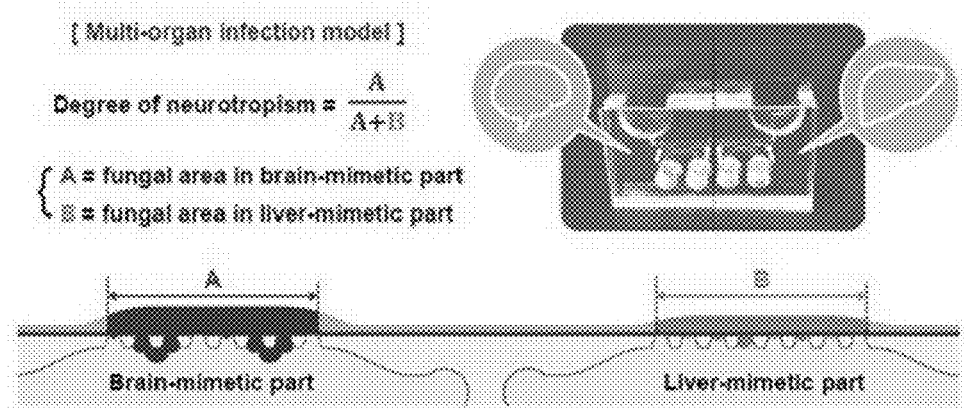
FIG. 18B relates to the multi-organ hNVU chip model for fungal neuroaffinity studies, and shows an example of a multi-organ hNVU chip with brain and liver units and a method for calculating the degree of neuroaffinity.
Figure 18C:
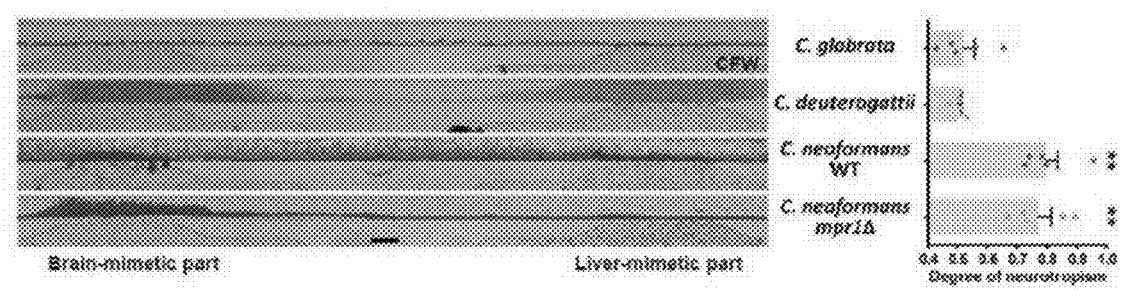
FIG. 18C relates to the multi-organ hNVU chip model for fungal neuroaffinity studies, and shows evaluation of the fungal neuroaffinity in the multi-organ hNVU chip with brain and liver units. The distribution and degree of neuroaffinity of CFW-labeled fungal cells in the multi-organ chip (n=5, technical replicates=2-3, **p<0.01 compared to *C. glabrata* group) were quantified. All the images were taken after 1 day of inoculation. The scale bar represents 500 μm.
Figure 19:
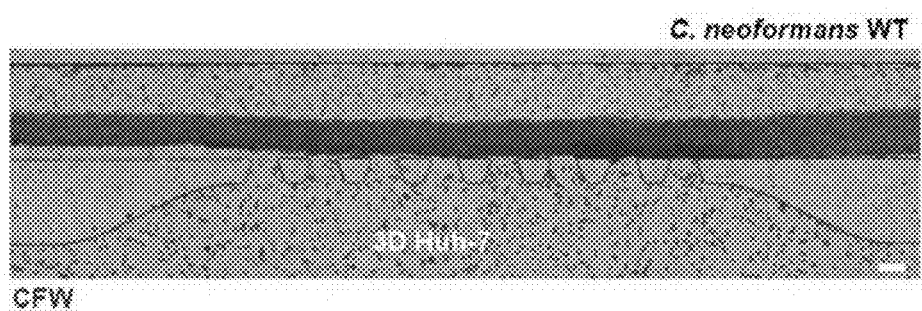
FIG. 19 shows a 3D liver-mimicking infection model, and shows a fluorescence image of CFW-labeled *C. neoformans* injected into a liver-mimicking model where human NSCs were replaced with a human liver cancer cell line (Huh-7). Fungal cells were cultured for 1 day. The scale bar represents 100 μm.

The present inventors found that the *C. neoformans*, unlike the *C. glabrata* and *C. deuterogattii* strains, tended to cluster mainly around the EC layer near the 3D brain unit, and further tested the hNVU chip as an in vitro model for monitoring neuroaffinitve behaviors of microorganisms (FIG. 18A). In order to confirm whether this neuroaffinity was caused by interaction between neuronal cells and each type of *Cryptococcus* cells, the present inventors inoculated *C. neoformans* WT cells into the same chip cultured with a human liver cancer cell line (Huh-7) instead of NSC, but no significant clustering similar to that observed in a brain-mimicking hNVU chip was observed (FIG. 19). The present inventors further investigated neuroaffinity of *C. neoformans* in a multi-organ hNVU chip prepared by adding a liver-mimicking unit to the hNVU chip (FIG. 18B). The multi-organ hNVU chip is designed to have brain (NSC) and liver (Huh-7) units connected to the EC layer through one channel to identify and visualize organ-specific preferences of microorganisms (FIG. 2A, FIG. 2B and FIG. 18B). By flowing the medium from right to left, the fungal cells first contacted the liver unit (FIG. 18C). In order to quantitatively measure neuroaffinitive movements of fungal cells, the present inventors defined the level of neuroaffinity according to the equation shown in FIG. 18B. Here, the CFW-stained fungal region (A) in the brain-mimicking unit was divided by the total CFW-stained fungal regions (A+B) in both the brain- and liver-mimicking units.

In the multi-organ hNVU chip model, the *C. glabrata* BG2 strain was evenly distributed over the entire EC layer regardless of the presence of the 3D brain and liver units (FIG. 18C; level of neuroaffinity of about 0.5). Conversely, the *C. deuterogattii* R265 strain was more stacked in an EC layer adjacent to the 3D brain and liver units than an EC region with no cell contact in the middle of the chip, but showed no noticeable preference to any organ, which indicates a lack of neuroaffinity of the *C. deuterogattii* (FIG. 18C; level of neuroaffinity of about 0.5). Unlike the *C. glabrata* and *C. deuterogattii*, the *C. neoformans* cells were more preferentially stacked on an EC layer on the brain unit than on the liver unit, which indicates a clear neuroaffinity (FIG. 18C; level of neuroaffinity of about 0.8). In particular, the *C. neoformans* mpr1 mutant showed neurogenicity similar to that of the WT H99 strain, but significantly reduced BBB invasion (FIG. 18C), which indicates that the metalloprotease MPR1 is important in the BBB invasion by the *C. neoformans*, but not in the neuroaffinity of the *C. neoformans*.

Figure 18D:
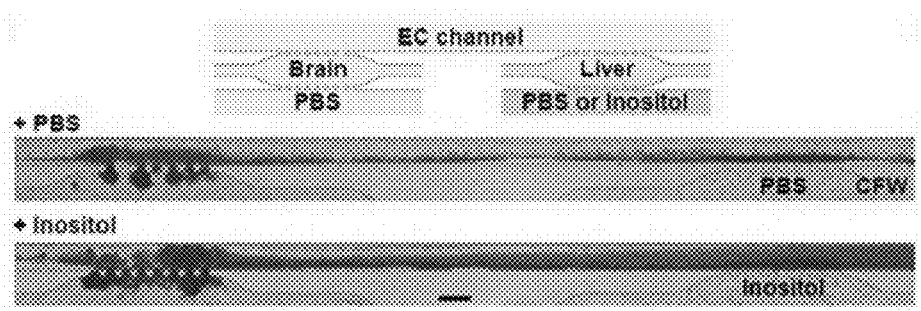
FIG. 18D relates to the multi-organ hNVU chip model for fungal neuroaffinity studies, and shows a schematic diagram and a representative image of CFW-labeled wild type *C. neoformans* in the multi-organ chip with inositol supplementation. All the images were taken after 1 day of inoculation. The scale bar represents 500 μm.
Figure 18E:
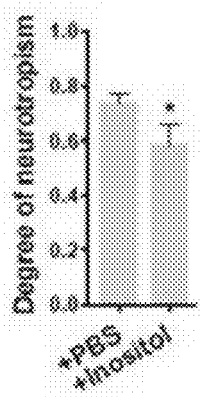
FIG. 18E relates to the multi-organ hNVU chip model for fungal neuroaffinity studies, and shows neuroaffinity in chips with or without inositol supplementation into liver units. All the images were taken after 1 day of inoculation. The scale bar represents 500 μm.
Figure 18F:
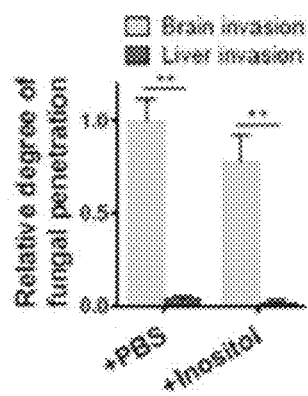
FIG. 18F relates to the multi-organ hNVU chip model for fungal neuroaffinity studies, and compares tissue penetration in chips with or without inositol supplementation into liver units (n=5, technical replicates=2-3, *p<0.05 and **p<0.01). All the images were taken after 1 day of inoculation. The scale bar represents 500 μm.

In the course of Cryptococcal brain infection, host-derived inositol has been reported to act as a major stimulant that promotes BBB invasion by the *C. neoformans*. As the human brain contains a large amount of inositol, free inositol in brain tissue is absorbed by Itr1a and Itr3c, the inositol transporters of the *C. neoformans*, and then induces expression of HA synthase (CPS1) in the *C. neoformans*. As a result, the increased surface expression of HA on the *C. neoformans* cells facilitates binding to a CD44 receptor on ECs42 and thus promotes BBB invasion. Based on these previous findings, the present inventors hypothesized that supplementation of the liver unit with inositol in the multi-organ chip could induce the liver preference of the *C. neoformans* and increase the invasion into the liver unit. To test this possibility, the present inventors added 200 mg/ml of inositol only to the liver unit through a lower channel (FIG. 18D). Inositol treatment actually increased the recruitment of *C. neoformans* to the EC layer near the liver unit (FIG. 7D) and thus reduced the level of neuroaffinity of the *C. neoformans* (FIG. 18E). Nevertheless, only the presence of inositol did not increase fungal invasion into the liver unit through the EC barrier (FIG. 18D and FIG. 18F). These results indicate that inositol is required for the neuroaffinitive recruitment of *C. neoformans*, but there may be other neuroaffinity factors that facilitate invasion of the *C. neoformans* into the EC barrier. Considering all the results, the multi-organ hNVU chip can be an efficient tool for investigating neuroaffinitve behaviors of microorganisms.

In the present disclosure, the present inventors developed a hNVU-mimicking chip containing functional BBB and neuronal components in a microfluidic device. The hNVU chip system has the following advantages over the previously reported BBB-mimicking platform: (1) a modified 3D hydrogel that mimics the brain matrix; (2) optimal culture conditions that enable co-culture of different cell types; (3) an in situ human NSC differentiation strategy to provide essential components for BBB and brain tissue; (4) placement of an EC layer to facilitate quantification and real-time observation in a BBB unit; (5) a tube/syringe-free dynamic fluid system configured to increase the culture and analysis efficiency; and (6) a multi-organ chip design to perform a fungal invasion test and validate the neuroaffinity. Based on these advantages, the hNVU chip successfully simulated the neuroaffinity and BBB invasion process of human fungal pathogen *C. neoformans*. Most of the previously reported platforms have been tested for drug permeation and efflux across the BBB and response to drugs, but have not been applied to investigate behaviors and pathogenic mechanisms of living microorganisms during brain infection. Therefore, the present hNVU-mimicking platform can be employed to investigate large-scale screening of BBB-microbial interactions and mutations to identify factors for microbial BBB-invasion and neuroaffinity.

First, the hydrogel composition was originally optimized to better display the 3D brain matrix. A collagen hydrogel has been most widely used in 3D culture due to its excellent cell-matrix interaction, but often undergoes significant shrinkage and contraction during culture resulting in deformation of the 3D structure. Another commonly used hydrogel, fibrin, is also not suitable for BBB system due to its angiogenic effect to induce EC movement. To overcome these drawbacks of current ECM hydrogels, the present inventors used a hybrid hydrogel (BHEM) consisting of HA-CA, a HA conjugate modified by a catechol group and collagen. The HA-CA component not only increased the similarity of mechanical properties to brain tissue, but also maintained the hydrogel structure inside the chip due to its adhesive properties (FIG. 8). Since HA is one of the most abundant ECM components and plays a major structural role in brain tissue, HA supplementation further contributes to the reconstruction of the original brain ECM microenvironment. The optimal ratio and concentration of HA-CA and collagen components capable of forming the EC layer in the right position were confirmed (FIG. 8G and FIG. 8H). Therefore, the BHEM hydrogel appears to provide an ideal 3D niche without affecting the NSC differentiation potential (FIG. 8F).

The second remarkable feature of the hNVU chip is the successful reproduction of the function of the neurovascular unit in BBB and brain tissue through in situ differentiation of human NSC and co-culture of brain EC and PC in the microfluidic device. The compartmentalization of the cellular components required for the BBB and brain unit in the hNVU chip was spontaneously induced in situ by a spatially regulated distinction pattern of human NSC differentiation according to the distance from the brain EC layer, which is essentially similar to cell morphogenesis in the brain. In the 3D BHEM hydrogel near the EC layer, human NSCs were in direct contact with EC and tended to differentiate into astrocytes in response to a paracrine signal from the EC (FIG. 11B and FIG. 11D) and thus formed an astrocyte vascular end feet-like structure. (FIG. 11E). The astrocyte vascular end feet structure composed of EC and surrounding the blood vessels has been known to play an important role in regulating BBB function in a neurovascular unit and has contributed to functional BBB-simulation. In a system without NSC in a 3D matrix, EC moved towards a 3D hydrogel unit and caused an EC monolayer to collapse (FIG. 14A). It seems that astrocytes, i.e., cells differentiated from NSC, somehow supported the EC layer in the right place. Most of human NSCs far from the EC layer were neurons, differentiated into oligodendrocytes at a low ratio, and formed 3D neurovascular units (FIG. 11B and FIG. 12B). Neurons and oligodendrocytes were often not considered major components of the BBB model. However, given the known interactions with BBB to control physiology, metabolism and homeostasis in the brain, recent studies have attempted to establish a 3D neurovascular unit containing neurons. Due to the reported important role of PC controlling BBB function, the PC was integrated into the 3D neurovascular unit and interacted with surrounded blood vessels composed of EC to support the structure and function of the BBB barrier (FIG. 11C and FIG. 13). Further, the present inventors optimized the culture conditions to support multiple co-cultures of NSC, EC and PC in an hNVU chip by regulating the medium components, supplementary factors and serum content (FIG. 9 and FIG. 10). In situ differentiation of human NSCs with EC co-culture enables the development of an in vivo-similar hNVU model structurally similar to BBB and 3D brain tissue without a need for a primary culture or separate stem cell differentiation to produce human brain cell sources such as astrocytes and neurons.

A final unique feature of this hNVU chip was emphasized as a simple and stable culture system with a constant unidirectional medium flow to improve the structural integrity and function of the BBB. In many previous studies, a medium flow has been generated in a microfluidic chip using a syringe or a peristaltic pump. In this case, each chip requires a tube connected to the pump for dynamic flow, which makes it difficult to conduct high-throughput studies. The present inventors have devised a simple and efficient flow culture system with a minimal set-up. Since chips can be stacked in a box without being individually connected to pumps and tubes (FIG. 3A and FIG. 5B), the system can increase culture and analytical throughput and thus ultimately promote high-throughput screening and monitoring. Laminar shear stress generated by normal blood flow has been known to maintain the structure and function of blood vessels by controlling endothelial cytoskeleton and vascular homeostasis. The present inventors' application of the set-up to the stepwise unidirectional flow promoted tight junction formation between the ECs (FIG. 14A and FIG. 14B) and substantially improved the integrity and functionality of the BBB unit in the hNVU chip. The stepwise unidirectional flow culture up-regulated the expression of the efflux carrier P-gp, which pumps drugs and foreign materials out of the brain (FIG. 14C). Therefore, the present inventors observed that the calcein AM molecule were accumulated in the EC layer of the BBB unit without a medium flow, but not in the BBB with a medium flow (FIG. 14D), which indicates that not only the expression of P-gp, which is known to be highly distributed in cerebrovascular cells, but also the function thereof can be enhanced under the flow of a culture medium. Also, shear stress is known to inhibit excessive EC proliferation and thus suppress EC overgrowth and movement to a 3D hydrogel unit in a microfluidic chip. Interestingly, the present inventors discovered that an oscillating bidirectional flow generated by an axial stirrer causes abnormal EC phenotype and vascular leakage (FIG. 15). It has been reported that such a non-laminar flow induces an abnormal EC phenotype, which increases the EC barrier permeability and consequently leads to the development of vascular disease. Under inflammatory, degenerative and traumatic conditions, BBB selectively responds to cytokines, such as TNF-α, for neuroendocrine control. When the BBB layer of the hNVU chip was exposed to TNF-α, the permeability gradually increased, but returned to the basic level when cytokine stimulation was withdrawn (FIG. 14E and FIG. 14F). Therefore, the hNVU chip provides a powerful and functional BBB system and is useful for modeling cerebrovascular disease, injury and inflammation using various fluid dynamics and biochemical treatments.

The hNVU chip has been successfully used to investigate the brain infection mechanism of the universal fungal meningitis pathogen C. neoformans, compared to other human fungal pathogens, including C. glabrata and C. deuterogattii, which do not cause fungal meningitis. Although the incidence rate for Cryptococcal meningitis has increased worldwide and the mortality rate is high especially in patients with immunodeficiency, the underlying mechanism of C. neoformans approaching the central nervous system and penetrating the BBB remains uncertain. This may be because there is no reliable model system to visualize the pathogen's real-time neuroaffinitive movement and invasion and to quantitatively evaluate these events. The transwell system which has been most widely used to monitor BBB invasion of C. neoformans and in which EC is cultured does not reflect complex BBB structure and function due to a lack of other important hNVU cell components (for example, PC, neuron) and is not suitable for visualizing fungal movement. Conventional murine-based toxicity and fungus testing only provides end-point results and no invasion behavior can be observed at the BBB invasion point. In particular, there is currently no in vitro model system available to monitor fungal neuroaffinity. Therefore, the hNVU chip system of the present disclosure is the first in vitro system capable of demonstrating both BBB invasion and neuroaffinity characteristics of fungal pathogens.

In the present disclosure, the present inventors visualized the BBB invasion process of C. neoformans in a real-time method for the first time due to the above-mentioned characteristics of the hNVU chip. There are three possible hypotheses for the mechanism of BBB invasion by C. neoformans: (1) intercellular invasion through damaged or loose junctions between ECs, (2) transcytosis through ECs, or (3) Trojan horse model of pathogen delivery mediated by monocyte/macrophage. Based on the observations of the present inventors, after initial adhesion to BBB, C. neoformans appeared to form a biofilm-like cell cluster on the brain unit. In particular, the clustered cells were able to invade the BBB without significantly affecting EC tight junctions or creating any evidence holes. According to previous studies, C. neoformans was reported to be able to pass through EC without cleavage of tight junctions. Instead, the present inventors observed changes in EC morphology during BBB invasion by C. neoformans, which may occur during transcytosis (FIG. 16C). Even if the tight junctions are not cleaved, there may be some damage on the EC by the C. neoformans, which may cause such structural changes. In the present disclosure, since immune cells were not included in the chip, the Trojan horse hypothesis could not be tested. However, since the system can co-culture fungal and immune cells, this hypothesis can be studied later.

The data obtained from multi-organ chip studies provide new insights into the neuroaffinitive movement of C. neoformans. The present disclosure is the first experimental demonstration of the neuroaffinity of C. neoformans in qualitative and quantitative manners. In a multi-organ hNVU chip having separate brain and liver units with the same EC layer, C. neoformans tended to be concentrated closer to the brain unit than to the liver unit, whereas C. deuterogattii was concentrated similarly in the both units (FIG. 18C). These results support the previous findings that C. neoformans preferentially infects the brain, leading to premature death, whereas C. deuterogattii has a relatively low neuroaffinity and mainly causes lung disease. In contrast, C. glabrata was evenly distributed in the EC layer, regardless of the presence of brain and liver units (FIG. 18C). Since C. neoformans mostly adheres to other fungi, its neuroaffinity is the result from increased specific adhesion of the brain unit to the BBB in the hNVU chip. The most likely explanation for this phenomenon is that brain cells can secrete small molecules and/or protein factors which can improve the BBB adhesion of C. neoformans. One of the candidate may be inositol, which is known to be abundant in the brain. C. neoformans was previously reported to induce the expression of the HA synthase gene CPS1, produce HA upon uptake of inositol, and then increase binding to CD44 glycoproteins in blood ECs42. In an experiment to support this, the present inventors found that inositol supplementation can increase recruitment and adhesion of C. neoformans to the EC layer of the liver unit (FIG. 18D and FIG. 18E). However, inositol alone did not fully promote the EC-liver barrier permeation of pathogens (FIG. 8D and FIG. 8F), which suggests that other factors may be specifically present in the brain unit.

In conclusion, the present inventors have successfully established an organ-on-a chip model capable of simulating a hNVU composed of functional human BBB and 3D brain-like tissue. By using the hNVU chip perform high-throughput screening for recently constructed large-scale recruitment of C. neoformans mutants, the present inventors can identify novel factors critical for fungal BBB movement and neuroaffinity and thus can more systematically analyze the mechanisms of brain infection by C. neoformans and its associated complex signal network. This will facilitate the discovery of microbial BBB invasion antagonists that contribute to the development of new drugs for infectious brain diseases. In addition, the hNVU chip will be useful in developing drug delivery systems targeting BBB and brain tissue. The multi-organ hNVU chip system can extend its usefulness through combinations of different types of organs and tissues with brain models (for example, brain and intestine models to reconstruct the intestinal-brain axis for modeling Parkinson's disease).

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: Microfluidic device
100': Complex microfluidic device
101: First channel
102: Second channel
102': 2-1 channel
103: Third channel
103': 3-1 channel
104: Chamber
200: Tilt control means
300: Support

We claim:

1. A microfluidic device for simulating a neurovascular unit, comprising:
a first channel configured to support a fluid flow that generates a shear stress;
a second channel which is adjacently connected to the first channel through one or more microholes, comprises a hydrogel including collagen and crosslinked or non-crosslinked hyaluronic acid at concentrations sufficient to support three-dimensional differentiation of neural stem cells into astrocytes, and is configured to culture astrocytes and neurons differentiated from neural stem cells in three dimensions;
a first chamber which is connected to one end of the first channel and comprises a culture medium;
a second chamber which is connected to another end of the first channel and comprises the culture medium; and
a third channel which is adjacently connected to the second channel and is configured to supply a drug or a nutrient to the second channel,
wherein the first channel comprises endothelial cells,
wherein the second channel comprises the astrocytes,
wherein the astrocytes in the second channel are distributed near the first channel according to a differentiation pattern of the astrocytes, and extend vascular end-feet structures that contact the endothelial cells in the first channel, forming a neurovascular interface that mimics a blood-brain barrier,
wherein the shear stress generated by the fluid flow in the first channel acts on the endothelial cells so that the endothelial cells, in response to the shear stress, interact with the astrocytes in the second channel to promote distribution of the astrocytes near the first channel,
wherein the first channel is configured to support a unidirectional flow by a height differential between the first and second chambers, wherein the first and second chambers are open to atmospheric pressure, enabling a controlled flow rate through the first channel that generates a shear stress on the endothelial cells of up to 6 dyne/cm$^2$, and
wherein the one or more microholes are openings directly connecting the first and second channels.

2. The microfluidic device of claim 1, wherein an inner surface of the first channel is coated with a coating solution comprising at least one selected from the group consisting of poly-L-lysine and collagen.

3. The microfluidic device of claim 1, wherein the endothelial cells are adhered and cultured on an inner surface of the first channel.

4. The microfluidic device of claim 1, further comprising:
pericytes adhered and cultured on lower ends of the endothelial cells and an inner surface of the first channel.

5. The microfluidic device of claim 1, wherein a concentration of the collagen in the hydrogel is from 3.0 mg/ml to 5.0 mg/ml, and a concentration of the crosslinked or non-crosslinked hyaluronic acid in the hydrogel is from 1.0 mg/ml to 10.0 mg/ml.

6. The microfluidic device of claim 1,
wherein the hydrogel has an expansion ratio represented by Equation 1 of from 50% to 150%:

$$\text{Expansion Ratio (\%)} = \frac{(Ws - Wi) \times 100}{Wi} \quad \text{[Equation 1]}$$

wherein Wi and Ws represent a dry weight of the hydrogel before incubation and a wet weight of the hydrogel after incubation with PBS at 37° C. for 3 days, respectively.

7. The microfluidic device of claim 1, wherein the culture medium is a medium in which an EGM-2 basal medium and a DMEM/F12 basal medium are mixed.

8. The microfluidic device of claim 7, wherein an N-2 supplement, an EGM-2 supplement, a pericyte growth supplement, and 0.5% to 3% FBS are added into the mixed medium as significant factors.

9. The microfluidic device of claim 1, wherein a mean diameter of the first channel is from 0.1 mm to 1.0 mm, and a mean diameter of the second channel is from 0.5 mm to 1.5 mm.

10. A blood-brain barrier simulation system, comprising:
a device of claim 1; and
a tilt control means for controlling a tilt of the device.

11. The blood-brain barrier simulation system of claim 10, wherein the tilt control means is a syringe pump located at a lower end of the device.

12. The blood-brain barrier simulation system of claim 10, wherein the tilt control means provides a unidirectional flow to the culture medium in the first channel.

13. The blood-brain barrier simulation system of claim 10, wherein in the device, the second channel or the another second channel is located at a lower end of the first channel.

14. A complex microfluidic device for simulating other organs than cerebral blood vessel, comprising:
a first channel configured to support a fluid flow that generates a shear stress;
a second channel which is adjacently connected to the first channel through one or more microholes, comprises a hydrogel including collagen and crosslinked or non-crosslinked hyaluronic acid at concentrations sufficient to support three-dimensional differentiation of neural stem cells into astrocytes, and is configured to culture astrocytes and neurons differentiated from neural stem cells in three dimensions, and another second channel configured to culture other organ cells;
a first chamber which is connected to one end of the first channel and comprises a culture medium;
a second chamber which is connected to another end of the first channel and comprises the culture medium; and
a third channel which is adjacently connected to the second channel and is configured to supply a drug or a nutrient to the second channel, wherein the first channel comprises endothelial cells,
wherein the second channel comprises the astrocytes,
wherein the astrocytes in the second channel are distributed near the first channel according to a differentiation pattern of the astrocytes, and extend vascular end-feet structures that contact the endothelial cells in the first channel, forming a neurovascular interface that mimics a blood-brain barrier,
wherein the shear stress generated by the fluid flow in the first channel acts on the endothelial cells so that the endothelial cells, in response to the shear stress, interact with the astrocytes in the second channel to promote distribution of the astrocytes near the first channel,
wherein the first channel is configured to support a unidirectional flow by a height differential between the first and second chambers, wherein the first and second chambers are open to atmospheric pressure, enabling a controlled flow rate through the first channel that generates a shear stress on the endothelial cells of up to 6 dyne/$cm^2$, and
wherein the one or more microholes are openings directly connecting the first and second channels.

* * * * *